(12) United States Patent
Abhishek Raja

(10) Patent No.: US 10,649,907 B2
(45) Date of Patent: May 12, 2020

(54) APPARATUS AND METHOD FOR HANDLING PAGE INVALIDATE REQUESTS IN AN ADDRESS TRANSLATION CACHE

(71) Applicant: Arm Limited, Cambridge (GB)

(72) Inventor: Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 238 days.

(21) Appl. No.: 15/928,165

(22) Filed: Mar. 22, 2018

(65) Prior Publication Data
US 2019/0294551 A1 Sep. 26, 2019

(51) Int. Cl.
*G06F 12/00* (2006.01)
*G06F 12/0891* (2016.01)
(Continued)

(52) U.S. Cl.
CPC ...... *G06F 12/0891* (2013.01); *G06F 12/1027* (2013.01); *G06F 8/65* (2013.01);
(Continued)

(58) Field of Classification Search
CPC ............. G06F 12/1045; G06F 12/1027; G06F 12/126; G06F 12/1036; G06F 12/10;
(Continued)

(56) References Cited

U.S. PATENT DOCUMENTS 7,461,210 B1 * 12/2008 Wentzlaff ............... G06F 12/126
711/120
8,140,820 B2 * 3/2012 Mansell ............... G06F 12/1036
711/133
(Continued)

*Primary Examiner* — Mardochee Chery
(74) *Attorney, Agent, or Firm* — Nixon & Vanderhye P.C.

(57) ABSTRACT

An apparatus is provided having processing circuitry for executing multiple items of supervised software under the control of a supervising element, and a set associative address translation cache having a plurality of entries, where each entry stores address translation data used when converting a virtual address into a corresponding physical address of a memory system comprising multiple pages. The address translation data is obtained by a multi-stage address translation process comprising a first stage translation process managed by an item of supervised software and a second stage translation process managed by the supervising element. Allocation circuitry is responsive to receipt of obtained address translation data for a specified virtual address, to allocate the obtained address translation data into an entry of a selected set of the address translation cache, where the selected set is identified using a subset of bits of the specified virtual address chosen in dependence on a final page size associated with the obtained address translation data. Filter circuitry is provided having a plurality of filter entries, and is responsive to detecting that a splinter condition exists for the obtained address translation data, to indicate in a chosen filter entry that the splinter condition has been detected for the specified item of supervised software that is associated with the obtained address translation data. The splinter condition exists when a first stage page size used in the multi-stage translation process exceeds the final page size. Maintenance circuitry is then responsive to a page invalidate request associated with an item of supervised software, to reference the filter circuitry to determine which entries of the address translation cache need to be checked in order to process the page invalidate request, in dependence on whether a filter entry of the filter circuitry indicates presence of the splinter condition for that item of supervised software.

20 Claims, 24 Drawing Sheets

(51) Int. Cl.
  *G06F 12/1027* (2016.01)
  *G06F 12/10* (2016.01)
  *G06F 12/1045* (2016.01)
  *G06F 12/1036* (2016.01)
  *G06F 12/126* (2016.01)
  *G06F 8/65* (2018.01)

(52) U.S. Cl.
  CPC .......... *G06F 12/10* (2013.01); *G06F 12/1036* (2013.01); *G06F 12/1045* (2013.01); *G06F 12/126* (2013.01); *G06F 2212/1016* (2013.01); *G06F 2212/657* (2013.01); *G06F 2212/683* (2013.01)

(58) Field of Classification Search
  CPC ........... G06F 12/0891; G06F 2212/657; G06F 2212/1016; G06F 2212/683
  USPC .......................................... 711/120, 133, 207
  See application file for complete search history.

(56) References Cited

U.S. PATENT DOCUMENTS

| | | | |
|---|---|---|---|
| 9,058,284 B1* | 6/2015 | Ben-Meir | G06F 12/10 |
| 2015/0242319 A1* | 8/2015 | Evans | G06F 12/1045 |
| | | | 711/207 |
| 2018/0101480 A1* | 4/2018 | Abhishek Raja | G06F 12/1027 |
| 2019/0205261 A1* | 7/2019 | Cheriton | G06F 8/65 |

\* cited by examiner

TWO-STAGE ADDRESS TRANSLATION

ENTRIES IN ADDRESS TRANSLATION CACHE

| 305 | 310 | 315 | 320 | 325 | 330 | 335 | 340 |
|---|---|---|---|---|---|---|---|
| VIRTUAL ADDRESS BITS [47:12] | PHYSICAL ADDRESS BITS [47:12] | PAGE SIZE INFO | VMID | ASID | OTHER ATTRIBUTES | V | ENTRY TYPE |
| | | | | | | | |

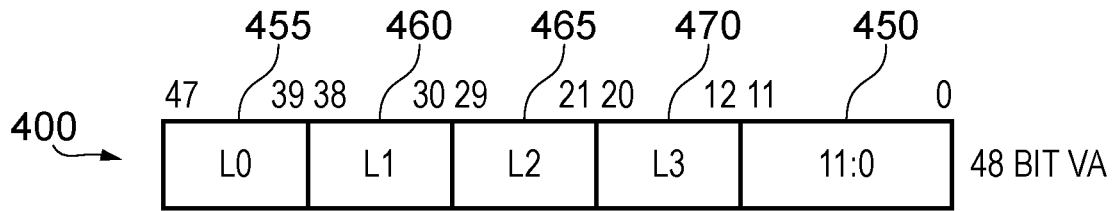
FOR ADDRESS TRANSLATION CACHE WITH 512 SETS
POSSIBLE STAGE 2 PAGE SIZES
| PAGE SIZE | INDEX BITS | COMPARE BITS | TYPE |
|---|---|---|---|
| 4KB | [20:12] | [47:21] | LEAF |
| 2MB | [29:21] | [47:30] | BLOCK |
| 1GB | [38:30] | [47:39] | BLOCK |
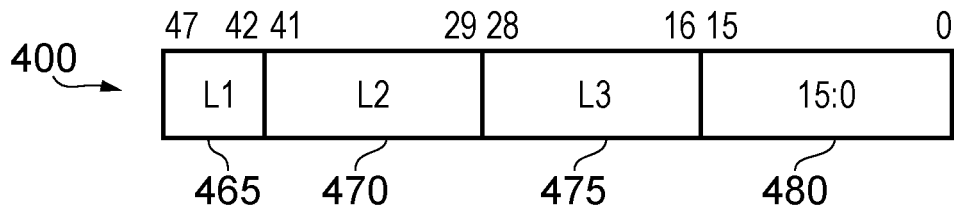
POSSIBLE STAGE 1 PAGE SIZES
| PAGE SIZE | INDEX BITS | COMPARE BITS | TYPE |
|---|---|---|---|
| 64KB | [24:16] | [47:25] | LEAF |
| 512MB | [37:29] | [47:38] | BLOCK |
FIG. 7

BLOOM FILTER CIRCUITRY

IF PAGE INVALIDATE REQUEST PROVIDES LEVEL HINT

| GRAIN SIZE | LEVEL HINT | INDICATED STAGE 1 PAGE SIZE |
|---|---|---|
| 4 KB | L3 | 4 KB |
| 4 KB | L2 | 2 MB |
| 4 KB | L1 | 1 GB |
| 64 KB | L3 | 64 KB |
| 64 KB | L2 | 512 MB |
| ⋮ | ⋮ | ⋮ |

FIG. 17

APPARATUS AND METHOD FOR HANDLING PAGE INVALIDATE REQUESTS IN AN ADDRESS TRANSLATION CACHE

BACKGROUND

The present technique relates to an apparatus and method for handling page invalidate requests in an address translation cache.

It is known to provide data processing systems which incorporate an address translation cache, such as a translation lookaside buffer (TLB), to store address translation data relating to the translation of virtual addresses to physical addresses. The provision of an address translation cache is useful in improving performance by reducing the number of slow page table walks to memory required in order to obtain the required address translation data.

It is also known to provide the address translation cache as a set associative structure. When a new item of address translation data is to be allocated into the set associative address translation cache, a number of bits of an associated virtual address can be used to form an index to identify a particular set within the address translation cache, with the address translation data then being stored within one of the entries of that set. The actual bits of the virtual address used to form the index will depend on the page size in memory associated with the address translation data.

When the associated processing circuitry that is using the address translation cache is arranged to execute multiple items of supervised software under the control of a supervising element, as for example is the case when a supervising element in the form of a hypervisor controls the operation of multiple guest operating systems, the address translation data can be obtained using a multi-stage translation process, where a first stage is managed by an item of supervised software and a second stage is managed by the supervising element. When employing such a process, the stage one page size may not be the same as the stage two page size, and the allocation of the address translation data into the address translation cache will take place based on whichever of those two page sizes is the smaller. This can cause issues when a page invalidate request associated with an item of supervised software is to be handled, in situations where the first stage page size exceeds the second stage page size (referred to herein as a splinter condition). In particular, in such a case it will not typically be possible for the maintenance circuitry to ascertain where the relevant address translation data will have been stored within the address translation cache, and accordingly it is typically necessary to scan the entire address translation cache to determine the entries that need to be invalidated. This can significantly impact performance.

Accordingly, it would be desirable to provide an improved mechanism for handling the performance of page invalidate requests in the presence of such a splinter condition.

SUMMARY

In one example configuration, there is provided an apparatus comprising: processing circuitry to execute multiple items of supervised software under the control of a supervising element; a set associative address translation cache having a plurality of entries, each entry to store address translation data used by the processing circuitry when converting a virtual address into a corresponding physical address of a memory system comprising multiple pages, the address translation data being obtained by a multi-stage translation process comprising a first stage translation process managed by an item of supervised software and a second stage translation process managed by the supervising element; allocation circuitry, responsive to receipt of obtained address translation data for a specified virtual address and for which the first stage translation process was managed by a specified item of supervised software, to allocate the obtained address translation data into an entry of a selected set of the address translation cache, where the selected set is identified using a subset of bits of the specified virtual address chosen in dependence on a final page size associated with the obtained address translation data; filter circuitry having a plurality of filter entries, and responsive to detecting that a splinter condition exists for the obtained address translation data, to indicate in a chosen filter entry that the splinter condition has been detected for the specified item of supervised software, the splinter condition existing when a first stage page size used in the multi-stage translation process exceeds the final page size; and maintenance circuitry, responsive to a page invalidate request associated with an item of supervised software, to reference the filter circuitry to determine which entries of the address translation cache need to be checked in order to process the page invalidate request in dependence on whether a filter entry of the filter circuitry indicates presence of the splinter condition for that item of supervised software.

In another example configuration, there is provided a method of handling page invalidate requests in an address translation cache of an apparatus having processing circuitry for executing multiple items of supervised software under the control of a supervising element, the method comprising: arranging the address translation cache as a set associative address translation cache having a plurality of entries, each entry storing address translation data used by the processing circuitry when converting a virtual address into a corresponding physical address of a memory system comprising multiple pages; obtaining the address translation data by a multi-stage translation process comprising a first stage translation process managed by an item of supervised software and a second stage translation process managed by the supervising element; allocating, responsive to receipt of obtained address translation data for a specified virtual address and for which the first stage translation process was managed by a specified item of supervised software, the obtained address translation data into an entry of a selected set of the address translation cache, where the selected set is identified using a subset of bits of the specified virtual address chosen in dependence on a final page size associated with the obtained address translation data; responsive to detecting that a splinter condition exists for the obtained address translation data, indicating in a chosen filter entry of the filter circuitry that the splinter condition has been detected for the specified item of supervised software, the splinter condition existing when a first stage page size used in the multi-stage translation process exceeds the final page size; and responsive to a page invalidate request associated with an item of supervised software, referencing the filter circuitry to determine which entries of the address translation cache need to be checked in order to process the page invalidate request in dependence on whether a filter entry of the filter circuitry indicates presence of the splinter condition for that item of supervised software.

In a yet further example configuration, there is provided an apparatus comprising: processing means for executing multiple items of supervised software under the control of a supervising element; set associative address translation cache means having a plurality of entries, each entry for storing address translation data used by the processing means when converting a virtual address into a corresponding physical address of a memory system comprising multiple pages, the address translation data being obtained by a multi-stage translation process comprising a first stage translation process managed by an item of supervised software and a second stage translation process managed by the supervising element; allocation means for allocating, responsive to receipt of obtained address translation data for a specified virtual address and for which the first stage translation process was managed by a specified item of supervised software, the obtained address translation data into an entry of a selected set of the address translation cache means, where the selected set is identified using a subset of bits of the specified virtual address chosen in dependence on a final page size associated with the obtained address translation data; filter means having a plurality of filter entries, and responsive to detecting that a splinter condition exists for the obtained address translation data, for indicating in a chosen filter entry that the splinter condition has been detected for the specified item of supervised software, the splinter condition existing when a first stage page size used in the multi-stage translation process exceeds the final page size; and maintenance means, responsive to a page invalidate request associated with an item of supervised software, for referencing the filter means to determine which entries of the address translation cache means need to be checked in order to process the page invalidate request in dependence on whether a filter entry of the filter means indicates presence of the splinter condition for that item of supervised software.

BRIEF DESCRIPTION OF THE DRAWINGS

The present technique will be described further, by way of illustration only, with reference to examples thereof as illustrated in the accompanying drawings, in which:

FIG. 5 schematically illustrates fields that may be provided within each entry in the address translation cache in accordance with one example configuration;

FIG. 7 illustrates how various portions of the virtual address may be used in one embodiment to identify the index bits and the compare bits used in the process illustrated in FIG. 6, dependent on the page size;

FIG. 17 is a table schematically illustrating how level hint and grain size information may be used to determine a stage one page size, in situations where the page invalidate request provides the level hint information.

DESCRIPTION OF EXAMPLES

Figure 1:
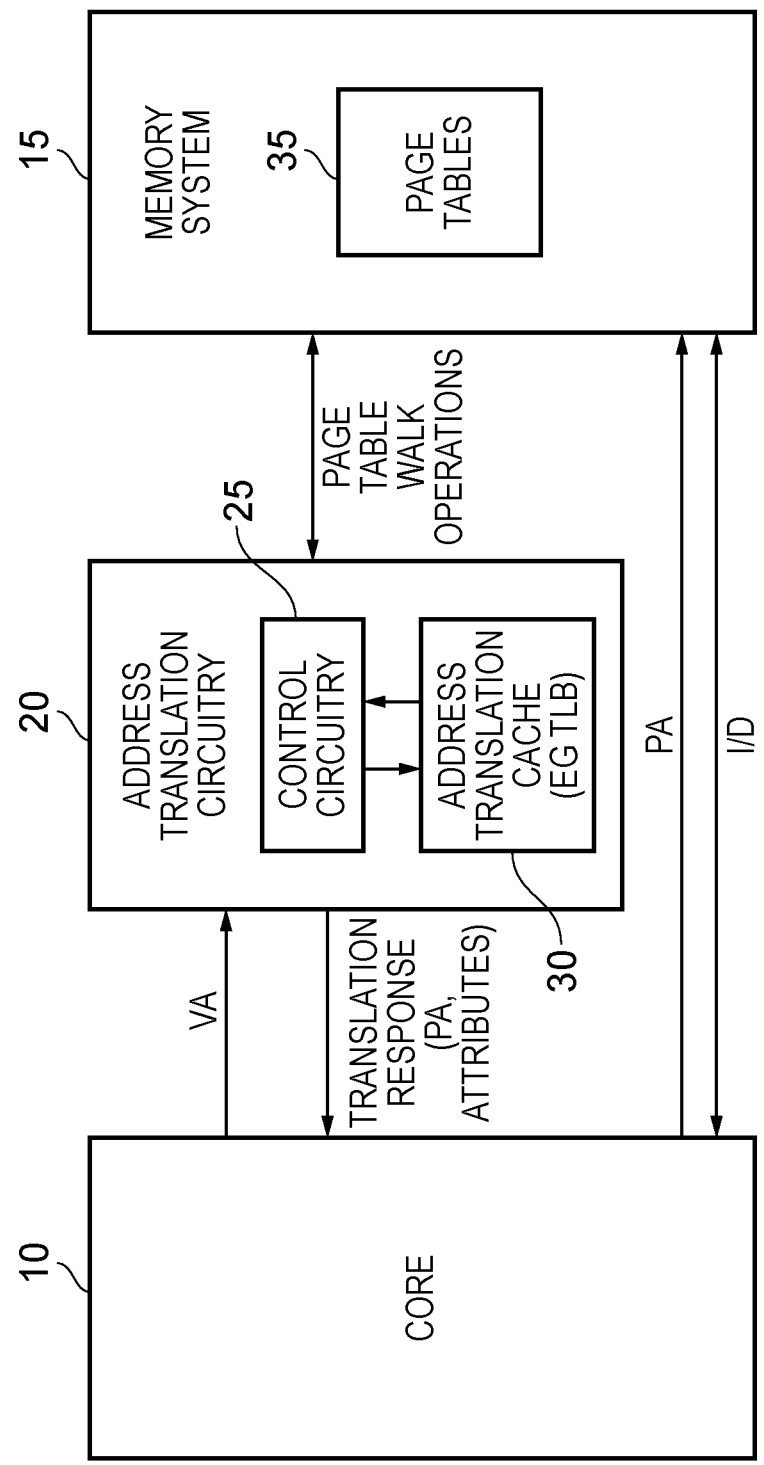
FIG. 1 illustrates a data processing system incorporating an address translation cache in accordance with one example configuration.

In one example arrangement, an apparatus is provided that has processing circuitry for executing multiple items of supervised software under the control of a supervising element, and a set associative address translation cache having a plurality of entries, where each entry is used to store address translation data used by the processing circuitry when converting a virtual address into a corresponding physical address of a memory system comprising multiple pages. The address translation data is obtained by a multi-stage translation process comprising a first stage translation process managed by an item of supervised software, and a second stage translation process managed by the supervising element.

Allocation circuitry is used to determine into which entry of the address translation cache to store each item of received address translation data. In particular, in response to receipt of obtained address translation data for a specified virtual address, and for which the first stage translation process was managed by a specified item of supervised software, the allocation circuitry can be arranged to allocate the obtained address translation data into an entry of a selected set of the address translation cache, where the selected set is identified using a subset of bits of the specified virtual address chosen in dependence on a final page size associated with the obtained address translation data. The final page size will be chosen to be the smaller of the first stage page size and the second stage page size used when determining the address translation data.

In accordance with the techniques described herein, filter circuitry is provided that has a plurality of filter entries, and is responsive to detecting that a splinter condition exists for the obtained address translation data, to indicate in a chosen filter entry that the splinter condition has been detected for the specified item of supervised software (in one example implementation this involves indicating the splinter condition in a filter entry that is chosen in dependence on an identifier for the specified item of supervised software, whilst in another example implementation a free filter entry is chosen and the identifier for the specified item of supervised software is stored therein). As discussed earlier a splinter condition exists when a first stage page size used in the multi-stage translation process exceeds the final page size, since in that event this means that the second stage page size was the page size used as the final page size, and hence the allocation into the address translation cache has been performed based on the second stage page size.

Maintenance circuitry is also provided for handling page invalidate requests. The maintenance circuitry is responsive to a page invalidate request associated with an item of supervised software and targeting a particular page, to reference the filter circuitry to determine which entries of the address translation cache need to be checked in order to process the page invalidate request. In particular, the determination as to which entries need to be checked is made in dependence on whether a filter entry of the filter circuitry indicates presence of the splinter condition for the item of supervised software associated with the page invalidate request. In particular, since the filter circuitry can maintain indications indicative of whether a splinter condition has been present when allocating address translation data associated with particular items of supervised software, then the item of supervised software associated with the page invalidate request can be used to initiate a lookup within the filter circuitry. If this identifies that the splinter condition is absent for those entries populated with address translation data associated with that item of supervised software, then this can significantly simplify handling of the page invalidate request.

Depending on how the filter circuitry is structured, it may be the case that when the filter circuitry indicates presence of the splinter condition, this may or may not categorically indicate that the splinter condition is present. For example, it may be the case that the filter circuitry is arranged such that a single entry maps to multiple items of supervised software. Nevertheless, this still provides a performance benefit, because in the situations where the relevant filter entry indicates that the splinter condition is not present, this definitively identifies that the splinter condition is not present, and accordingly a significantly simplified process can be used to process the page invalidate request in such situations.

For example, in one implementation, when the corresponding filter entry indicates absence of the splinter condition for the item of supervised software associated with the page invalidate request, the maintenance circuitry is arranged to use a virtual address specified by the page invalidate request to perform a targeted checking process on a first subset of the sets of the address translation cache. In particular, since it is known that the splinter condition does not exist having regard to the particular item of supervised software that is associated with the page invalidate request, then only a relatively small number of sets within the address translation cache need to be accessed in order to process the page invalidate request.

In one example implementation, the first subset comprises one set of the address translation cache for each final page size associated with address translation data in the address translation cache. In particular, for each such final page size, an associated number of bits of the provided virtual address are then used as an index to identify a particular set within the address translation cache. Using the final page size information, certain other bits of the virtual address can then be used as compare bits to see if there is a match between those compare bits and corresponding virtual address indication bits stored as part of the address translation data within each entry of the particular set. On detecting a match, that entry can then be invalidated.

In one example arrangement, when the corresponding filter entry indicates presence of the splinter condition for the item of supervised software associated with the page invalidate request, the maintenance circuitry is arranged to check every entry in the address translation cache in order to process the page invalidate request. However, use of the filter circuitry still provides a significant overall benefit, since only when the filter circuitry indicates that, for the particular item of supervised software in question, the splinter condition may be present, is there a need for an extended search to take place in order to identify the entries to invalidate, and whenever the splinter condition is determined to be absent for the item of supervised software in question, then a much more targeted approach can be taken in order to identify the entries to invalidate, thereby significantly improving performance.

The items of supervised software and the supervising element can take a variety of forms. However, in one example arrangement, each item of supervised software comprises a guest operating system, and the supervising element is a hypervisor used to manage execution of the guest operating systems. As will be well understood, the hypervisor can be constructed in a variety of ways, for example as software, firmware or hardware. When operating the apparatus in such a way, each guest operating system, along with the applications running there under, may be referred to as a virtual machine, with the hypervisor controlling the execution of multiple virtual machines on the apparatus.

In such an example use case, the filter circuitry can be arranged to be responsive to detecting that a splinter condition exists for the obtained address translation data, to indicate in the chosen filter entry that the splinter condition has been detected in association with the virtual machine identifier used to identify the guest operating system associated with the obtained address translation data.

The filter circuitry can take a variety of forms. For example, the filter circuitry may provide a fixed number of entries, where at any point in time one entry is allocated to a specific item of supervised software, and hence provides an exact indication as to whether the splinter condition exists for that item of supervised software. Each entry then can be arranged to store an identifier for the item of supervised software allocated to that entry. However, in an alternative arrangement the filter circuitry comprises a probabilistic data structure, the chosen filter entry is chosen in dependence on an identifier for the specified item of supervised software, and identifiers for a plurality of the items of supervised software map to the same filter entry. In one particular example case a Bloom filter arrangement may be used to implement the filter circuitry. In accordance with such an approach, when the filter entry is clear, this indicates that no item of supervised software that mapped to it has allocated any address translation data for which the splinter condition exists. However, when the filter entry is set, this does not provide a definitive indication that the splinter condition does in fact exist, since the filter entry may have been set based on a different item of supervised software. Nevertheless, this still ensures safe handling of the page invalidate request, since when the filter entry is set the extended search mechanism will be used to identify the entries to invalidate. By using such a probabilistic data structure, this can significantly simplify the filter circuitry, providing a high performance solution.

In another example arrangement, further performance benefits can be realised when the page invalidate request is arranged not only to specify a virtual address but also to provide a size indication of the first stage page size to which the page invalidate request relates. In particular, when such a form of page invalidate request is used, and when the corresponding filter entry indicates presence of the splinter condition for the item of supervised software associated with the page invalidate request, the maintenance circuitry can be arranged to use the virtual address and the size indication to perform an alternative targeted checking process on a second subset of the sets of the address translation cache. Whilst this second subset will typically be larger than the first subset referred to earlier, it will still enable a significant reduction in the number of entries that need to be analysed, when compared with the alternative approach where all of the entries within the address translation cache need to be analysed. In one example arrangement, the second subset comprises, for each final page size associated with address translation data in the address translation cache, a number of sets determined by dividing the indicated first stage page size by the final page size. Hence, by having knowledge of the first stage page size this can significantly reduce the number of entries that need to be analysed in order to process the page invalidate request in the presence of the splinter condition.

In one particular arrangement, when the size indication indicates a smallest page size supported by the address translation cache, the maintenance circuitry is arranged to determine that the splinter condition is absent, without reference to the filter circuitry, and to perform a checking process on one set of the address translation cache determined from the virtual address and the smallest page size. In particular, in this case it will be known that the first stage page size will also have been the final page size used for allocation, since it cannot be larger than the stage two page size in such a situation. Accordingly, in that instance a very high performance mechanism for performing the page invalidate request is provided.

In one example arrangement, the filter circuitry may be modified so that it comprises a filter block for each final page size supported by the address translation cache, each filter block comprising of plurality of filter entries. In such an arrangement, the filter circuitry may then be responsive to detecting that a splinter condition exists for the obtained address translation data, to indicate the splinter condition in a chosen filter entry of the filter block corresponding to the final page size associated with the obtained address translation data. Hence, by this approach, the contents of the filter circuitry provide a finer granularity of information which can then be used by the maintenance circuitry when deciding how to process the page invalidate request.

In particular, in one example arrangement, the maintenance circuitry is responsive to the page invalidate request associated with an item of supervised software to reference at least a subset of the filter blocks to determine whether the corresponding filter entry indicates presence of the splinter condition. When at least one of the referenced filter blocks indicates presence of the splinter condition, the maintenance circuitry is then arranged to determine the second subset of the sets to be subjected to the alternative targeted checking process in dependence on the one or more final page sizes for which the filter circuitry indicated presence of the splinter condition. Hence, this can potentially enable a further decrease in the number of sets that need to be accessed to process the page invalidate request.

In one example arrangement, the maintenance circuitry may exclude from the subset of the filter blocks to be referenced, any filter block for a final page size supported by the address translation cache that is equal to or greater than the first stage page size indicated by the size indication specified by the page invalidate request. In particular, it is known that the address translation data to be invalidated will not have been stored within the address translation cache with a final page size larger than the first stage page size indicated in the page invalidate request.

In one example arrangement where the filter circuitry comprises of a filter block for each final page size supported by the address translation cache, the second subset of sets of the address translation cache that need to be subjected to the checking procedure comprises, for each of the one or more final page sizes for which the filter circuitry indicates presence of the splinter condition, a number of sets determined by dividing the indicated first stage page size by that final page size.

In one example arrangement, each stage of the multi-stage translation process comprises a multi-level process, the size indication provided by the page invalidate request comprises a level hint, and the first stage page size is identified with reference to the level hint and a stage one grain size indication. Hence, rather than identifying the first stage page size directly, a level hint indication can instead be used, and the first stage page size can be inferred from that level hint, based on knowledge of a stage one grain size used by the system. In one implementation, the grain size information may also be provided with the page invalidate request, and the grain size may change in certain situations, for example on a context switch.

In situations where each stage of the multi-stage translation process comprises a multi-level process, the splinter condition will be determined to exist when the first stage page size of the final level used in the first stage translation exceeds the final page size. The final level used in the first stage translation may be a leaf descriptor in some situations, but in other situations it may be a block descriptor, and hence the final level is the level at which the page table walk process ended.

In order for the filter circuitry to work effectively, it is useful to avoid the filter circuitry becoming saturated, as in that event the filter circuitry is less likely to be able to identify situations where a reduced level of checking is required in order to process the page invalidate request. Hence, in one example arrangement, the apparatus may further comprise saturation control circuitry, responsive to detecting a saturation condition in respect of the filter circuitry, to initiate a maintenance operation within the address translation cache to invalidate any entries of the address translation cache that contain address translation data for which the splinter condition exists. The saturation control circuitry is further arranged on detecting the saturation condition to reset the entries of the filter circuitry to an initialised state. The presence of the splinter condition for each entry can be determined by analysing the contents of that entry. In particular, page size information may be provided as part of the address translation data, identifying both the final page size and the stage one page size, and accordingly by consideration of those two pieces of information, it is possible to detect presence of the splinter condition. Alternatively, an explicit field can be provided as part of the address translation data to identify presence of the splinter condition.

In one optional arrangement, the above discussed filter circuitry may form main filter circuitry, but the apparatus may also comprise coarse filter circuitry to maintain a record of which items of supervised software are associated with address translation data allocated into the address translation cache. In such an arrangement, the maintenance circuitry may be arranged, responsive to the page invalidate request associated with an item of supervised software, to reference the coarse filter circuitry to determine whether the item of supervised software has any address translation data allocated into the address translation cache, and to proceed to reference the main filter circuitry when the coarse filter circuitry does indicate that the item of supervised software has address translation data allocated into the address translation cache. Hence, in some situations this can avoid the need to reference the main filter circuitry at all, and hence further improve performance in the handling of the page invalidate request.

Particular examples will now be described with reference to the Figures.

FIG. 1 schematically illustrates a data processing system including a processor core 10 for executing program instructions and for performing data accesses (both instruction fetches and accesses to data to be manipulated) using virtual addresses VA. These virtual addresses are subject to address translation to physical addresses PA by address translation circuitry 20. The physical addresses are used to control access to instructions and data in a memory system 15. The memory system 15 may comprise a memory hierarchy, such as multiple levels of cache memory and a main memory or other non-volatile storage.

As shown in FIG. 1, the address translation circuitry 20 includes an address translation cache 30, which in one example may take the form of a translation lookaside buffer (TLB). The address translation cache 30 has a plurality of entries, where each entry stores address translation data used when converting a virtual address into a corresponding physical address of the memory system. The address translation data is determined by performing page table walk operations in respect of page tables 35 stored within the memory system 15. Through use of the page table walk operations, address translation data may be determined enabling a virtual address to be converted into a physical address, and that address translation data may be stored within the address translation cache 30.

As shown schematically in FIG. 1, when the core 10 issues a virtual address to the address translation circuitry 20, the control circuitry 25 can perform a lookup operation within the address translation cache 30 to determine whether a hit is detected within one of the entries of the address translation cache. In one example configuration, the address translation cache has a set associative structure, and certain bits of the virtual address may be used as an index into the address translation cache in order to identify a set, with the entries within that set being reviewed in order to determine whether a hit is detected. If a hit is detected, then a translation response can be returned directly to the processor core 10, this including physical address bits and associated attributes stored within the hit entry within the address translation cache. Based on this information, the core can then generate a physical address to output to the memory system 15 in order to access a required instruction, or data to be manipulated. If a hit is not detected within the address translation cache, the address translation circuitry 20 will initiate a page table walk process in order to access the relevant page tables 35 within the memory system in order to walk through a sequence of descriptors until a final level descriptor is obtained, at which point the address translation data can be determined and an appropriate translation response can then be returned to the core. The obtained address translation data can also be stored within an entry of the address translation cache 30. This is likely to enable a subsequently issued virtual address to result in a hit within the address translation cache, thereby reducing access times.

Figure 2:
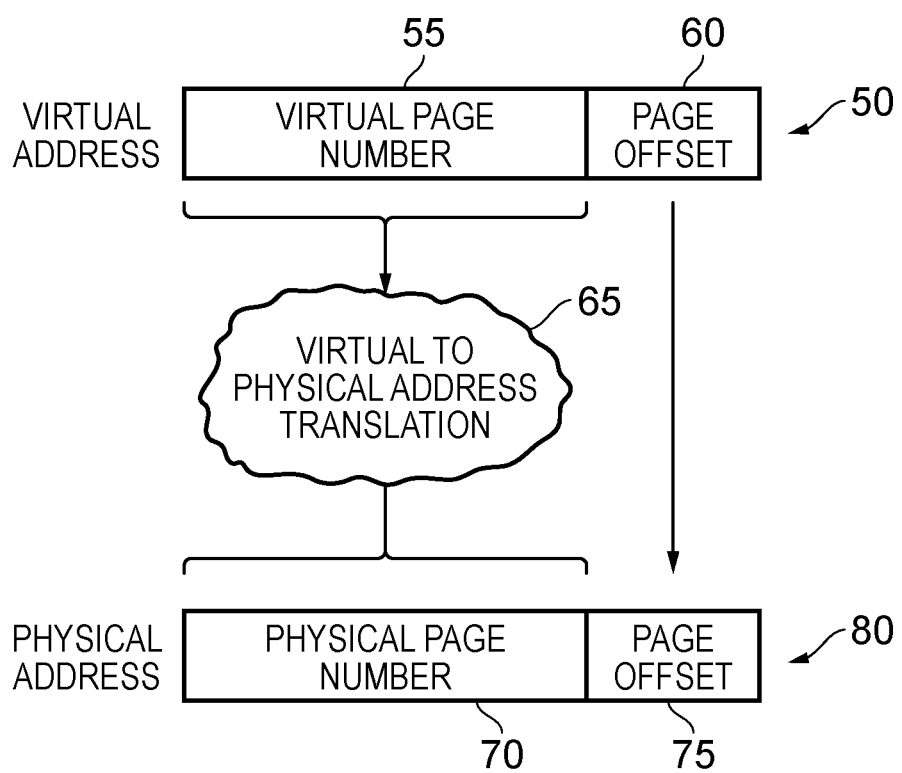
FIG. 2 is a diagram schematically illustrating a virtual address to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size. The address translation operation performed by the address translation circuitry 20 is illustrated schematically by the element 65 shown in FIG. 2, and serves to obtain address translation information sufficient to enable the virtual page number bits 55 to be translated into equivalent bits 70 of a physical address 80 identifying a physical page number. The page offset bits are not altered, and accordingly the page offset bits 75 are directly determined from the page offset bits 60 in the virtual address.

Figure 3A:
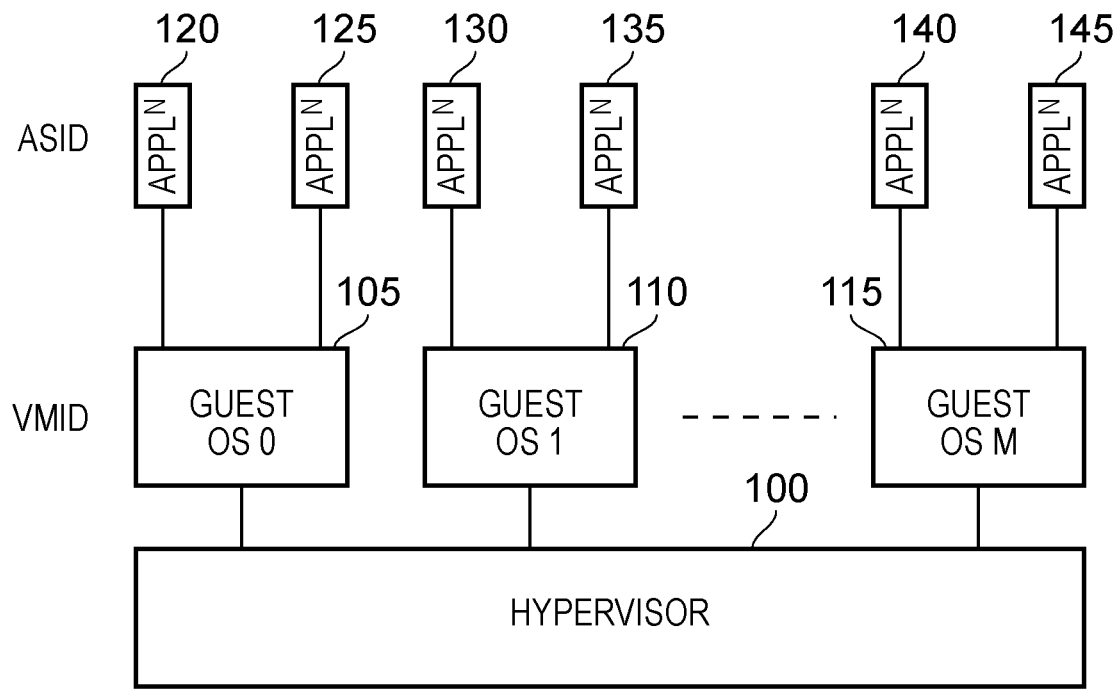
FIG. 3A schematically illustrates a virtual machine implementation.

As shown in FIG. 3A, the processor core 10 may be arranged to employ a hypervisor 100 to manage multiple virtual machines, each virtual machine consisting of a guest operating system 105, 110, 115 and associated applications 120, 125, 130, 135, 140, 145 executed by those guest operating systems. An identification scheme can be used to identify access requests issued by the various applications. In particular, a virtual machine identifier (VMID) can be associated with each guest operating system 105, 110, 115, and each application may have an associated address space identifier (ASID). When an access request is issued to the address translation circuitry 20 from the processor core 10, then a virtual address may be associated with that access request, and in addition both the VMID and ASID information may be provided to identify the application issuing the access request.

Figure 3B:
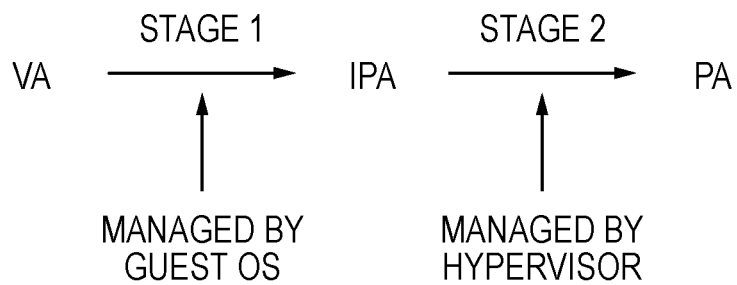
FIG. 3B illustrates a two-stage address translation process that may be used within a virtual machine implementation.

As shown in FIG. 3B, a two stage address translation process may be used in order to convert the virtual address specified by the access request into a physical address within the memory system 15. In particular, via a stage one translation process managed by the relevant guest operating system, a virtual address may be converted into an intermediate physical address, and then that intermediate physical address can be converted via a stage two translation process controlled by the hypervisor, in order to produce the final physical address. By such a two stage address translation process, a guest operating system is able to manage how the virtual addresses specified by particular applications are translated, but with the hypervisor still retaining some overall control in the process to ensure that the address spaces allocated within the memory system to the various virtual machines are kept separate.

Whilst at each stage of the address translation process, a single level of translation may be used, it is often the case that each stage of the address translation process includes multiple levels of translation.

It should be noted that it will not necessarily be the case that all address translation data allocated into the TLB 30 will be obtained by a multi-stage translation process. For instance, address translation data associated with the hypervisor 100 may be obtained by a single stage translation process, and may also be allocated into the TLB 30.

Figure 4:
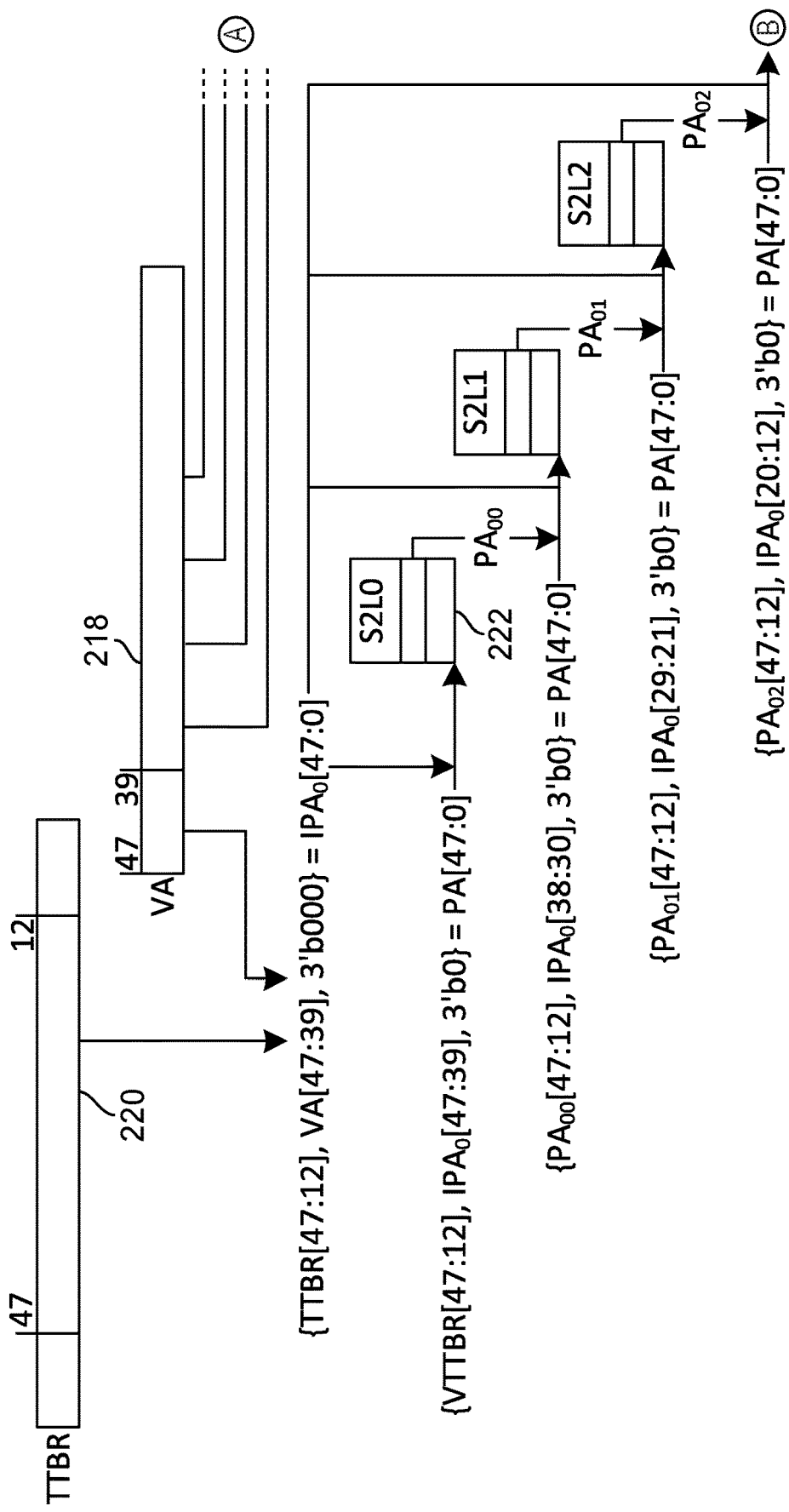
FIG. 4 schematically illustrates a two-stage, multi-level, page table walk that may be performed in order to obtain address translation data for storing in an entry of the address translation cache.
Figure 4:
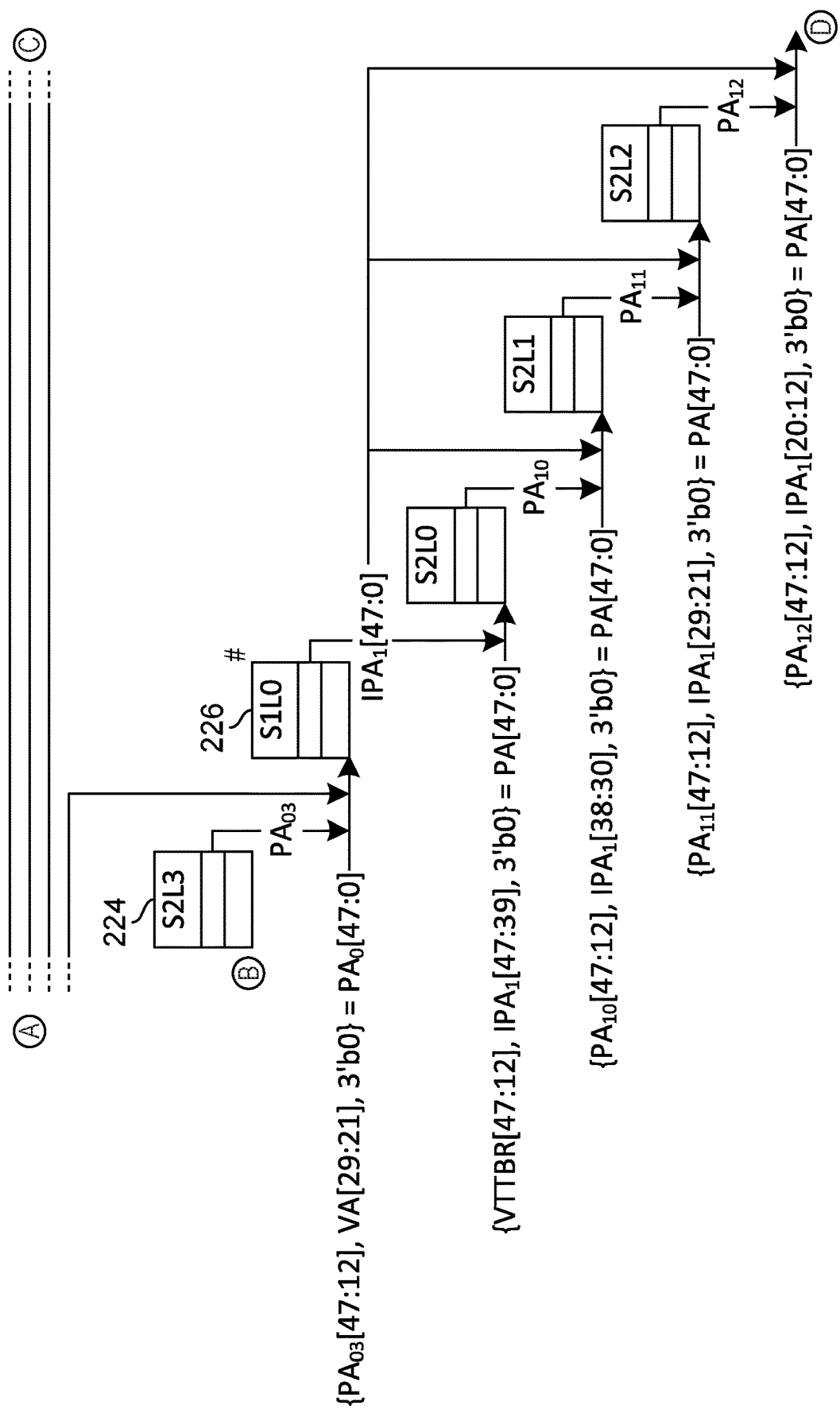
Figure 4:
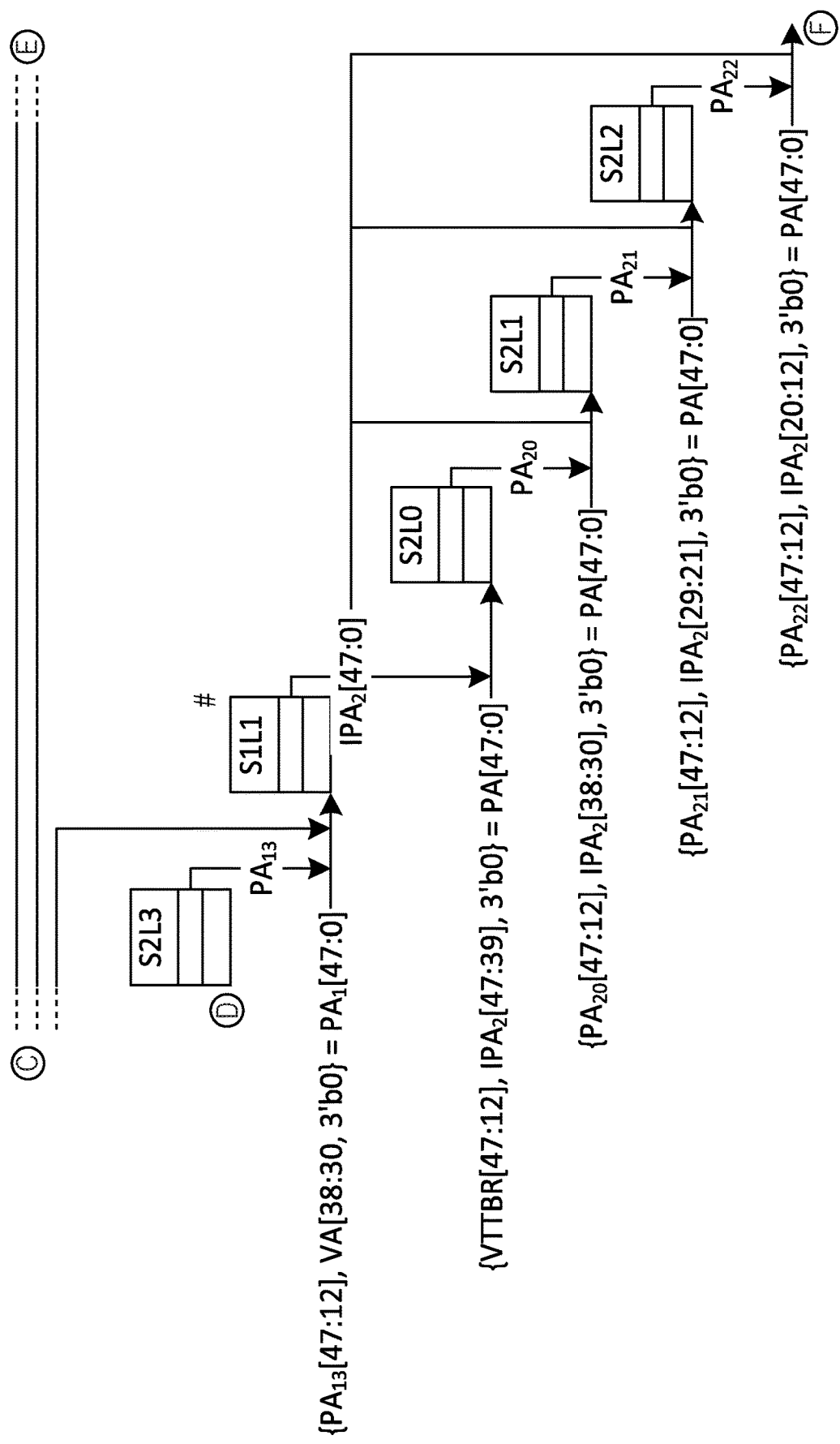
Figure 4:
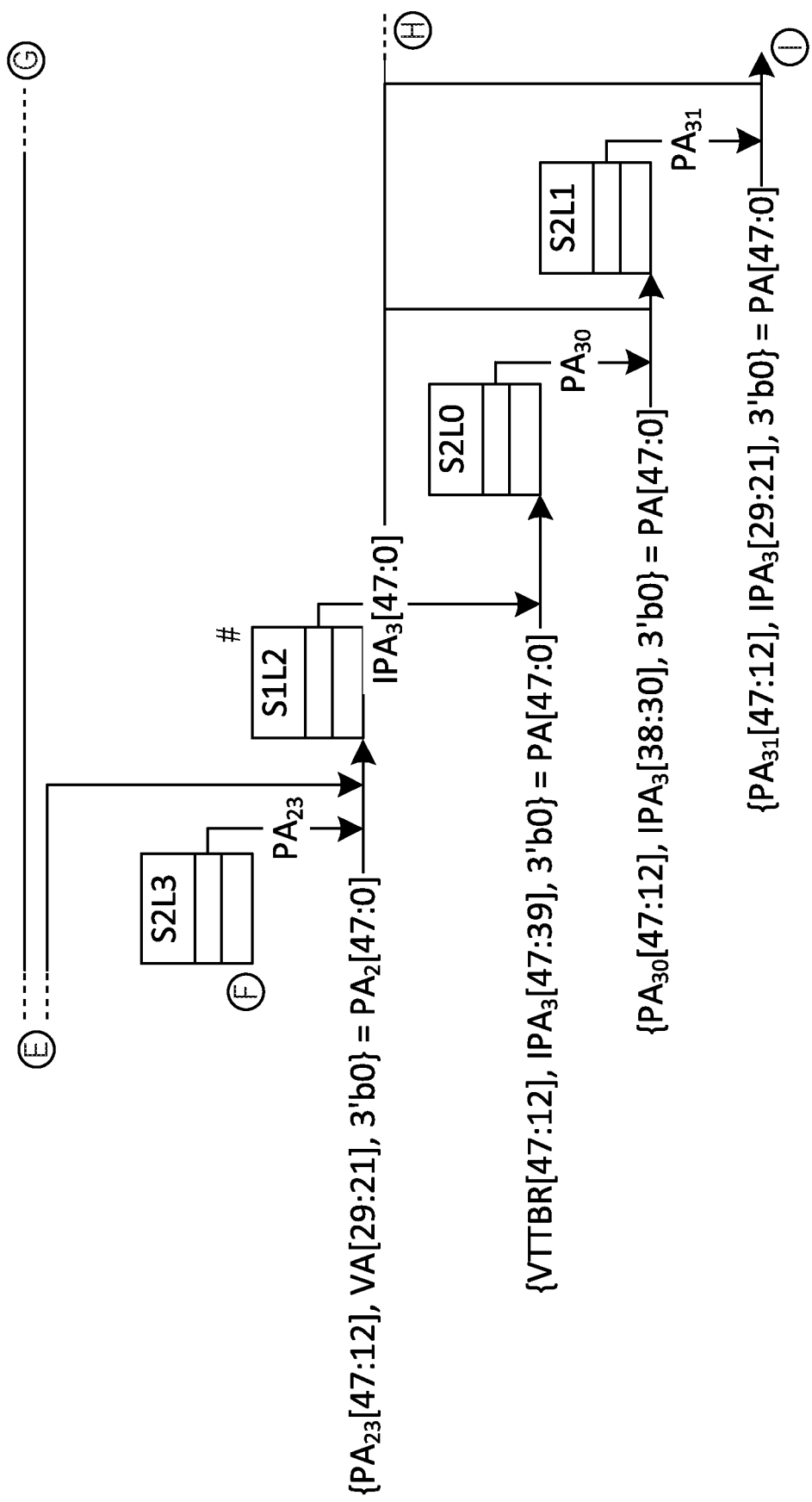
Figure 4:
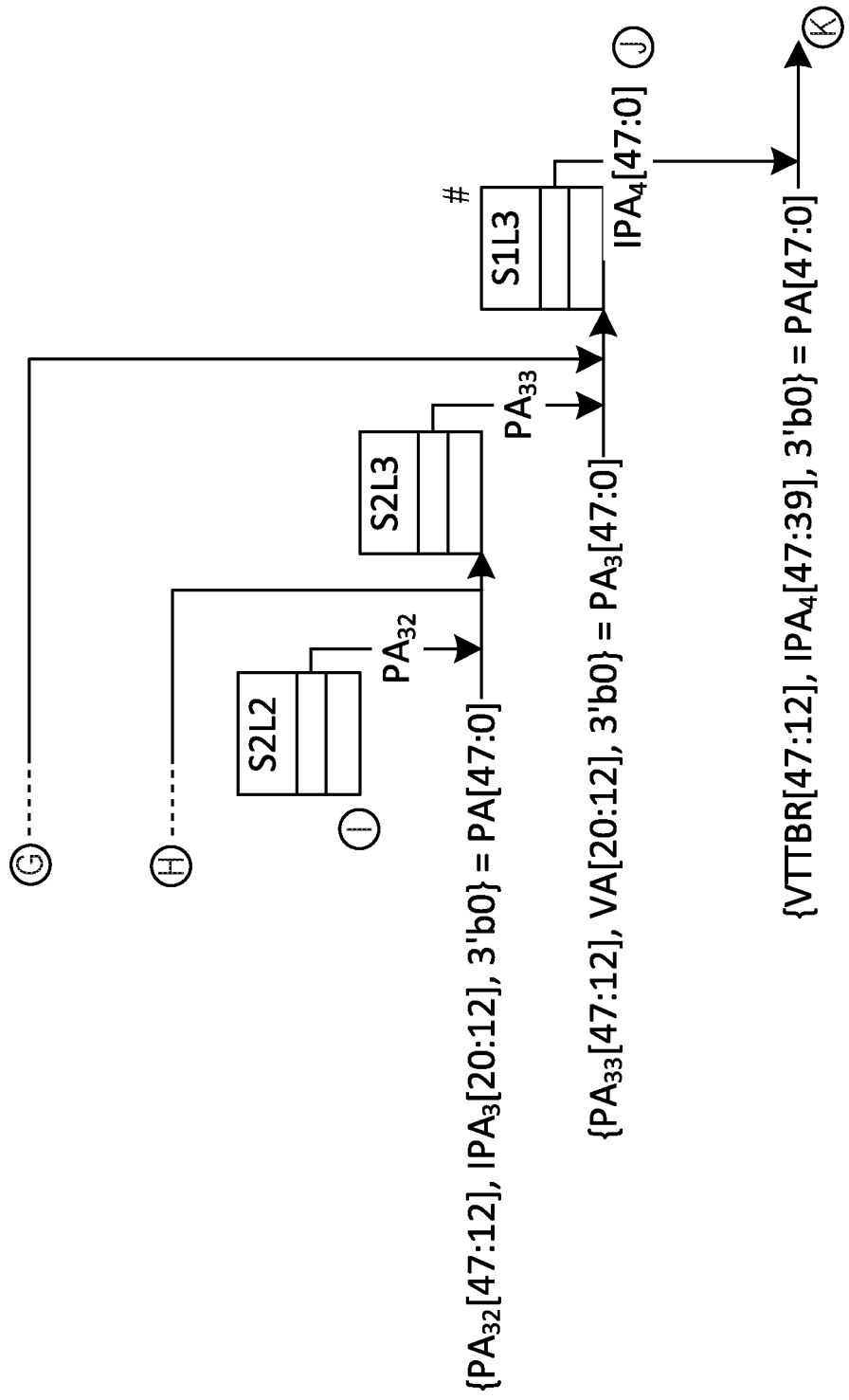
Figure 4:
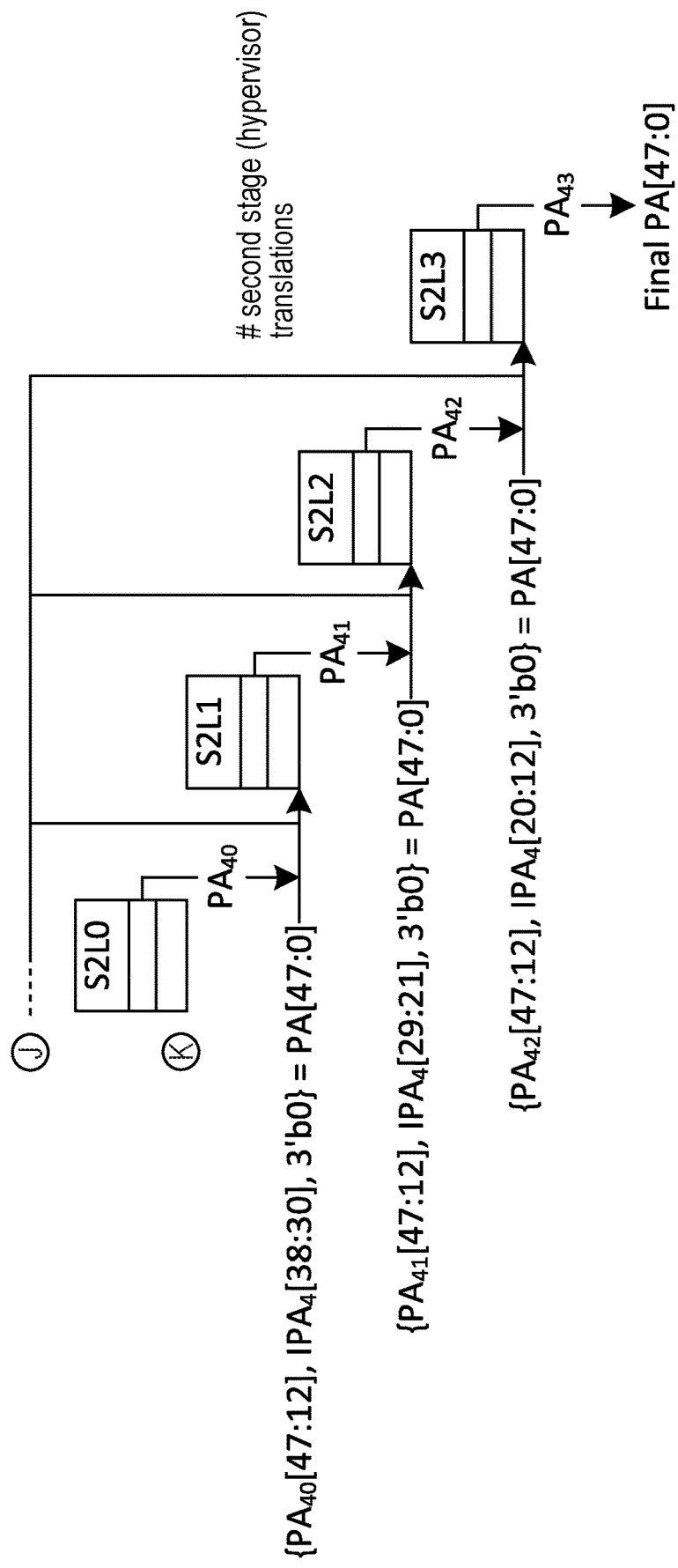

More details of a two stage, multi-level, address translation process will now be described with reference to FIG. 4. In particular, using a two stage process, the guest operating system controlled translation will convert a virtual address into an intermediate physical address during stage 1, whilst at the stage two translation a hypervisor controlled translation will convert the intermediate physical address into a physical address. Hence, in such a two-stage translation process as shown in FIG. 4, the virtual address 218 is combined with the address in the "guest" base register 220 to generate an intermediate physical address IPA which is translated by the hypervisor to generate the physical address of the first level page descriptor (as illustrating by the four levels of lookup from page table 222 to page table 224). The output from the page table 224 is the physical address of the guest level 0 (S1L0) page table 226. This page is indexed using bits of the VA and the descriptor returned contains an IPA which is translated again by the hypervisor, which produces a physical address of the guest's level 1 (S1L1) page table. This process continues until the physical address for S1L3 is accessed, which returns the final IPA. This IPA is translated (by the hypervisor) to produce the physical address for the data to be accessed, labelled as the "final PA" in.

FIG. 4. Thus the multiple-level page table walk illustrated in FIG. 4 may at its full extent involve 24 descriptor fetches until the final physical address is generated, having been subject to translation both by the translations managed by the guest operating system and the translations managed by the hypervisor. This type of two stage multiple-level page table walk is used in the Version 8 processor architecture of the processors designed by Arm Limited of Cambridge, England.

It will be appreciated from the description of FIG. 4 that the address translation data ultimately depends on a final stage one descriptor (in the example of FIG. 4 this being the S1L3 descriptor) and a final stage two descriptor (in the example of FIG. 4 this being the final S2L3 descriptor). These final level descriptors may also be referred to as page descriptors or leaf descriptors. It should be noted that in some instances the final level descriptors can be specified at an earlier level in the page table walk process. For example, a level two descriptor may have a block field, which when set, indicates that that descriptor is a block descriptor, which is a type of final level descriptor. Hence, the information within that descriptor can then be used to produce the final address translation data.

The page size associated with the final level descriptor will differ depending on whether the final level descriptor is a leaf descriptor or a block descriptor. Also, the stage one and stage two page sizes may differ, so that a stage one leaf descriptor does not necessarily have the same page size associated with it as a stage two leaf descriptor. The final page size associated with an entry made within the address translation cache will be the smaller of the final stage one page size and the final stage two page size. This can cause certain complexities when storing the address translation data within a set associative address translation cache, where a portion of the virtual address determined in dependence on the final page size is used to identify the index into the address translation cache, and hence identify the set within which the address translation data may be stored.

In particular, when a page invalidate request is subsequently issued in association with a particular guest operating system, requiring a particular page associated with the stage one page size to be invalidated, if the stage one page size is bigger than the stage two page size, and hence the allocation into the address translation cache has been made on the basis of the stage two page size, it is unknown where within the cache the relevant information is stored that needs to be invalidated, and typically this requires all of the entries that are in the address translation cache to be analysed in that situation in order to determine which entries to invalidate. This has a very significant performance impact. As will be discussed with reference to the later figures, a mechanism is described herein that significantly improves the performance when handling such page invalidate operations in the presence of a splinter condition, the splinter condition being the condition where the stage one page size is larger than the stage two page size.

FIG. 5 is a diagram schematically illustrating fields that may be provided within each entry of the address translation cache in accordance with one example arrangement. Here the address translation cache 300 comprises multiple entries, each entry including a virtual address field 305 containing a certain number of the virtual address bits. In the example illustrated in FIG. 5, it is assumed that the page offset for the smallest page size is, as discussed earlier with reference to FIG. 2, given by bits 11 to 0, and accordingly only the more significant bits starting from bit 12 need to be stored in the virtual address portion 305. In this example, it is assumed that the virtual address is a 48-bit value, and accordingly bits 47 to 12 are stored in field 305.

The physical address field 310 then provides the corresponding physical address bits. Here, it is assumed that the physical address is the same size as the virtual address, although this is not a requirement, and in some instances the physical address will have a different number of bits to the virtual address.

A page size field 315 is also provided to capture information about the page size associated with the address translation data in the entry. In one example arrangement, this page size information captures the final page size, as mentioned earlier this being the smaller of the final stage one page size and final stage two page size, and also provides an indication of the final stage one page size.

As shown by the fields 320, 325, the VMID and ASID information for which the address translation data is applicable can also be provided within the entry, whilst a field 330 can be used to capture any other attributes associated with the address translation data. These attributes can take a variety of forms, and may for example include access permissions, and memory type information, such as whether the associated page relates to a writeback region of memory, a non-cacheable region, etc.

A further field 335 is used to store a valid bit to identify if the entry stores valid information. In addition, a field 340 may be provided to indicate an entry type of the address translation data stored within the corresponding entry. For example, the information in this field could identify whether the address translation data is derived from a leaf descriptor or a block descriptor. In an alternative example arrangement, the page size information could be encoded as part of the entry type information, such that the page size field 315 and the entry type field 340 are logically combined into a single field that conveys both type and size, thereby potentially reducing the amount of storage required for the combination of the type and size fields.

Figure 6:
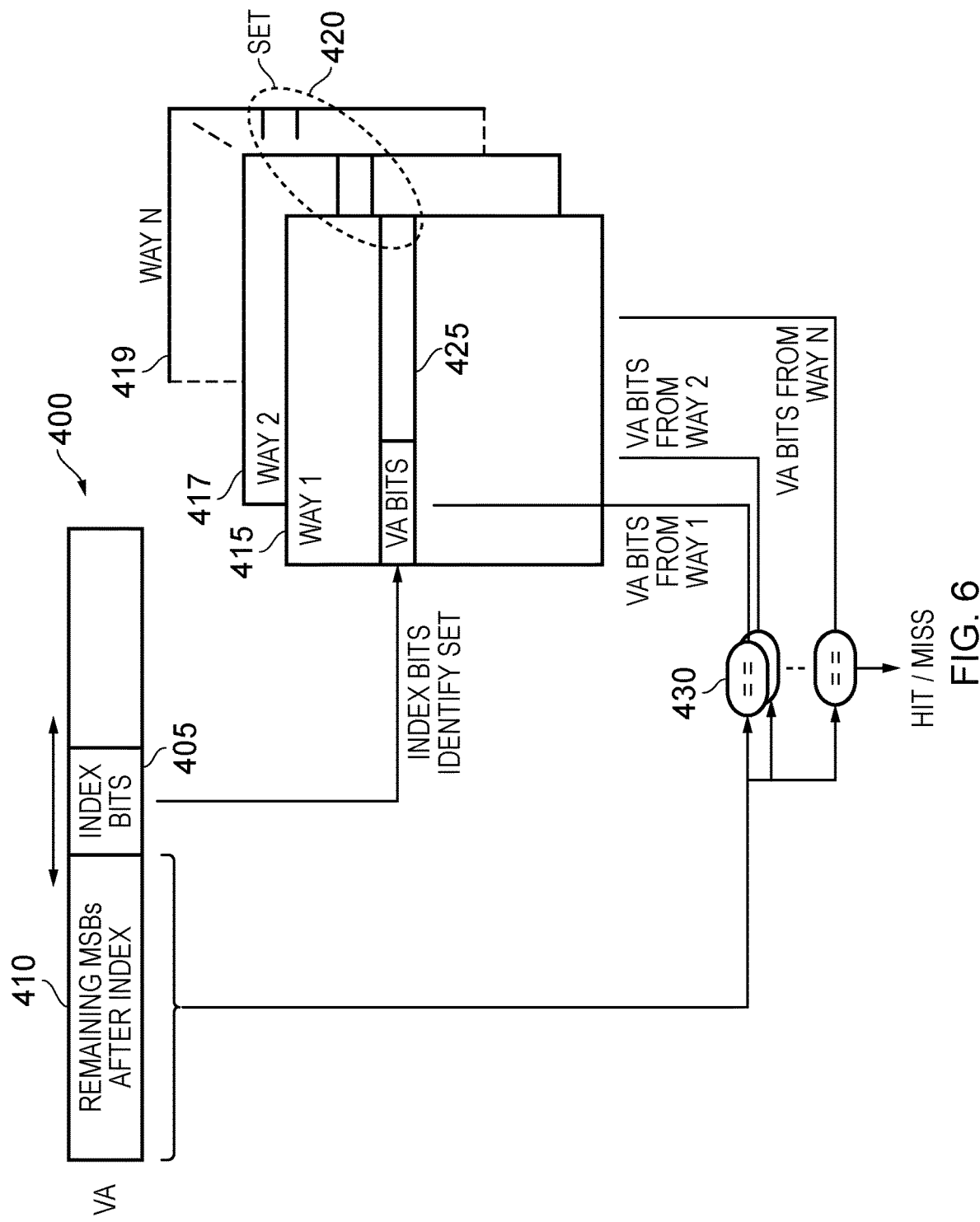
FIG. 6 is a diagram schematically illustrating how a virtual address is used to access entries within a set associative address translation cache in accordance with one example arrangement.

FIG. 6 is a diagram schematically illustrating how a virtual address is used to access entries within a set associative address translation cache in accordance with one example arrangement. In particular, a certain number of index bits 405 within the virtual address 400 will be identified based on an assumption about page size, and those bits will be used as an index into the various ways 415, 417, 419 of the set associative structure in order to identify a set 420 containing one entry in each way. The contents of those entries within the set may then be routed to comparison circuitry 430 where the remaining most significant bits 410 of the virtual address (i.e. the bits more significant than the index bits) will be compared with corresponding bits in the virtual address field of each entry 425 in order to detect whether a hit is present. Only entries marked as valid will be considered, and other criteria may also need to be met for a hit to be detected (e.g. page size match and VMID and ASID match).

How the page size influences the index bits 405 selected from the virtual address is illustrated schematically in FIG. 7 for the example of a 48-bit virtual address 400. The two tables shown in FIG. 7 for example stage 1 and stage 2 page sizes assume an address translation cache with 512 sets. Above each table, the relevant virtual address portions are shown. Considering first the situation where a lookup is performed assuming a stage 2 page size was used for allocation, then the 48-bit virtual address 400 can be considered to contain the portions 450, 455, 460, 465, 470. Assuming a 4 KB page size, bits 20 to 12 (i.e. those associated with the level 3 stage 2 page table walk process) are chosen as the index bits, with bits 47 to 21 then forming the compare bits. In this example, it is assumed that an entry whose page size indicates 4 KB will relate to address translation data of the leaf type discussed earlier.

However, as mentioned earlier, address translation data may also be determined from block descriptors, in which case the effective page size is larger. For example, an entry may contain address translation data associated with a block descriptor identified at the level 2 stage 2 page table walk process. The page size for such an entry may be 2 MB, and in that instance a stage 2 lookup will use bits 29 to 21 as the index bits, and use bits 47 to 30 as the compare bits. Similarly, for address translation data associated with a block descriptor at the level 1 stage 2 page table walk process, a 1 GB page may be used, and in that instance the index bits are formed by bits 38 to 30, with bits 47 to 39 being used as the compare bits.

It will be appreciated that block descriptors do not need to be provided at multiple levels, and indeed in some implementations no such block descriptors may be used.

The same page sizes may be available in association with the stage 1 translations. However, alternatively the leaf page size (also referred to as the grain size) may be different for the stage 1 pages and the stage 2 pages. In such a case, the virtual address 400 can be considered to contain the portions 465, 470, 475, 480. The bottom table shows an example where the stage 1 leaf page size is 64 KB. If it is assumed that an entry has been allocated based on such a stage 1 page size, then in that case bits 24 to 16 (i.e. those associated with the level 3 stage 1 page table walk process) of the virtual address are chosen as the index bits, with bits 47 to 25 then forming the compare bits. As another example, an entry may contain address translation data associated with a block descriptor identified at the level 2 stage 1 page table walk process. The page size for such an entry may be 512 MB, and when performing a stage 1 lookup in that instance bits 37 to 29 are used as the index bits, and bits 47 to 38 are used as the compare bits.

Figure 8:
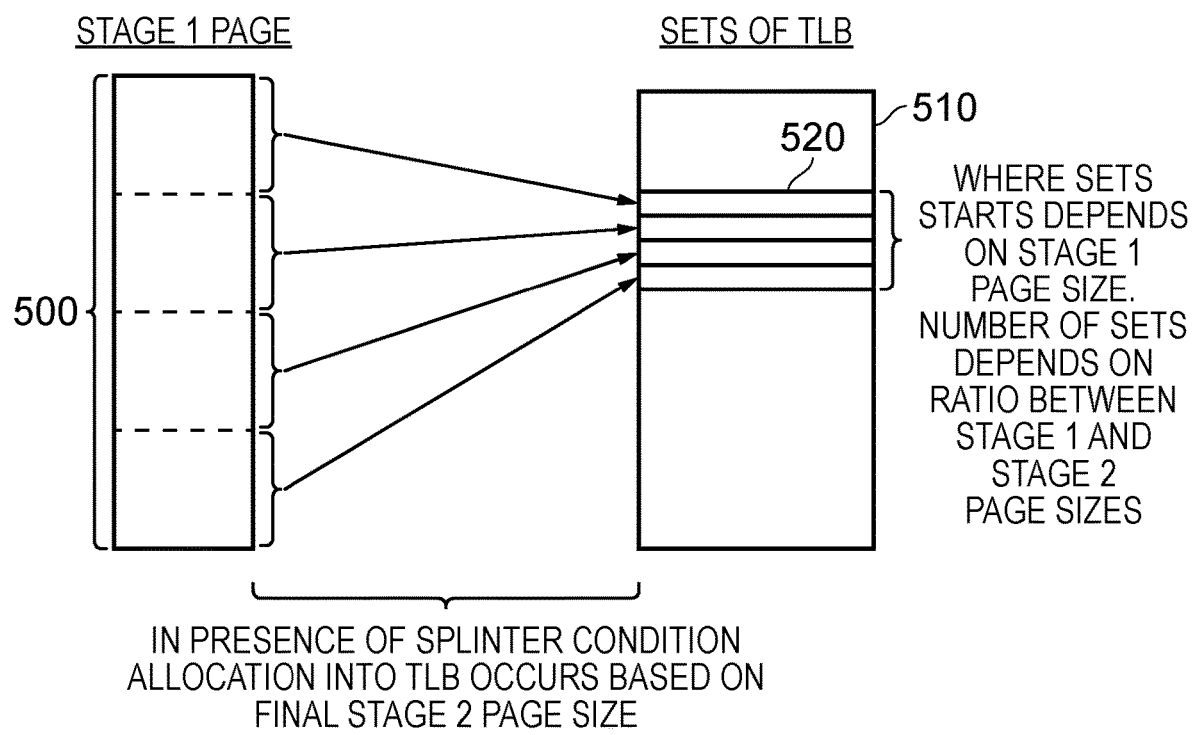
FIG. 8 is a diagram schematically illustrating allocation of entries into the address translation cache in the presence of a splinter condition.

As mentioned earlier, the final page size for allocation of address translation data into the TLB is the smaller of the final stage 1 page size and the final stage 2 page size. If the final stage 1 page size is greater than the final stage 2 page size, then this means there is a splinter condition, and in particular it is not known which set or sets will store the address translation data corresponding to the stage 1 page. This is illustrated schematically in FIG. 8, where a stage 1 page 500 is assumed to be four times bigger than the final stage 2 page size. In order to allocate the address translation data for the entire stage 1 page 500, four separate entries will be allocated in the TLB, and in particular one entry in four consecutive sets 520 within the TLB 510 will be identified for storing the address translation data for each of the four pages of the final page size. In general, where the consecutive series of sets starts will depend on the stage 1 page size. Further, the number of sets that will store the address translation data will depend on the ratio between the stage 1 and stage 2 page sizes. For example, if the stage 1 page size is 16 times the stage 2 page size, then there will be a consecutive series of 16 sets storing the address translation data. As a result, if a page invalidate request is received that is associated with a particular guest operating system, and hence is a page invalidate request relating to a page managed by that guest operating system (i.e. a stage 1 page), it will typically be necessary to review every entry in the TLB in order to identify the appropriate entries to be invalidated, which can give rise to a significant performance impact. However, as will be discussed with reference to the remaining figures, a mechanism is provided that can significantly reduce the performance impact of handling page invalidate requests.

Figure 9:
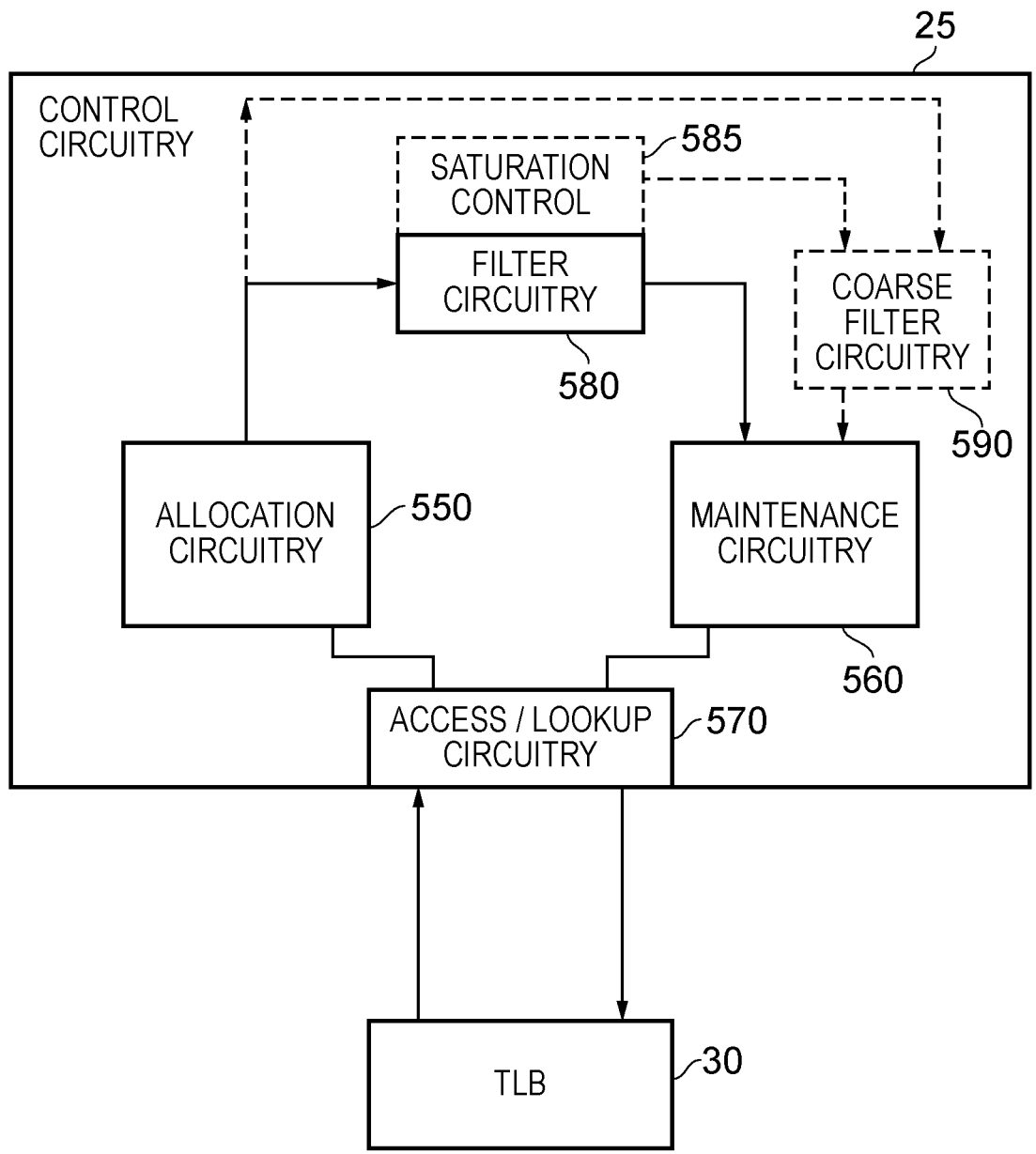
FIG. 9 is a block diagram illustrating in more detail components that may be provided within the control circuitry of FIG. 1 in accordance with one example arrangement.

FIG. 9 is a block diagram illustrating in more detail components provided within the control circuitry 25 of FIG. 1 in accordance with one example implementation. The control circuitry 25 has access/lookup circuitry 570 for performing access operations in respect of the TLB 30, either to allocate address translation data into a chosen entry, or to perform lookup operations to process access requests issued from the processor core. For obtained address translation data that is to be allocated into the TLB 30, the allocation circuitry 550 is used to perform the allocation process, using the access/lookup circuitry 570 to access the TLB 30. In particular, the allocation circuitry will allocate the obtained address translation data into an entry of a selected set of the address translation cache, where the selected set is identified using a subset of bits of the associated virtual address chosen in dependence on a final page size associated with the obtained address translation data.

At the time of allocation, the allocation circuitry will know whether the splinter condition exists, since it will know the final page size, and the final stage 1 page size. In accordance with the techniques described herein, filter circuitry 580 is provided that has a plurality of filter entries. Responsive to detection of the splinter condition existing for the obtained address translation data, the filter circuitry is used to indicate in a chosen filter entry that the splinter condition has been detected in association with the virtual machine identifier used to identify the guest operating system associated with the obtained address translation data. In particular, as discussed earlier a VMID value can be used to identify the guest operating system, and in one embodiment the chosen filter entry is used to indicate presence of the splinter condition for that VMID identifier.

When the maintenance circuitry 560 subsequently receives a page invalidate request associated with a guest operating system, it then references the filter circuitry to determine whether the filter circuitry indicates that the splinter condition is present for at least one item of address translation data allocated into the TLB 30 where that address translation data is associated with that guest operating system (i.e. that guest operating system managed the stage 1 translation used to obtain that address translation data). The maintenance circuitry can then determine which entries of the address translation cache need to be checked in order to process the page invalidate request depending on whether the filter circuitry identifies the presence of the splinter condition or not in association with the particular guest operating system.

In one embodiment, the filter circuitry 580 is the only filter circuitry provided. However, in an alternative arrangement, the filter circuitry 580 may be considered as the main filter circuitry, but coarse filter circuitry 590 may also be provided. In particular, the coarse filter circuitry can maintain a record of which guest operating systems are associated with address translation data obtained using the multi-stage translation process and allocated into the address translation cache. The maintenance circuitry can then be arranged, in response to a page invalidate request associated with a particular guest operating system, to reference the coarse filter circuitry to determine whether that particular guest operating system has any address translation data obtained using the multi-stage translation process and allocated into the address translation cache. If not, no further action is needed in respect of the TLB contents, but if so the maintenance circuitry can then proceed to reference the main filter circuitry 580 in order to determine which entries in the TLB 30 need checking in order to process the page invalidate request.

In order for the filter circuitry 580 (and the coarse filter circuitry 590) to operate effectively, it is desirable for the information in the filter circuits to not saturate. It will be appreciated that the point at which the filter circuitry is considered to be saturated can be chosen dependent on implementation. For example, in a simple filter circuitry containing a finite number of entries, where each entry is allocated to a particular VMID, the filter circuitry may be considered to be saturated when all of the entries are used, or alternatively when a significant number of the entries are used and it is considered appropriate to deal with the saturation condition before all of the entries become used. For a probabilistic form of filter circuitry, such as when a Bloom filter is used, then it may be considered that the filter circuitry is saturated when a certain percentage of the Bloom filter entries are set. The steps taken by the saturation control circuitry 585 to handle the saturation condition will be discussed later with reference to FIG. 18.

Figure 10:
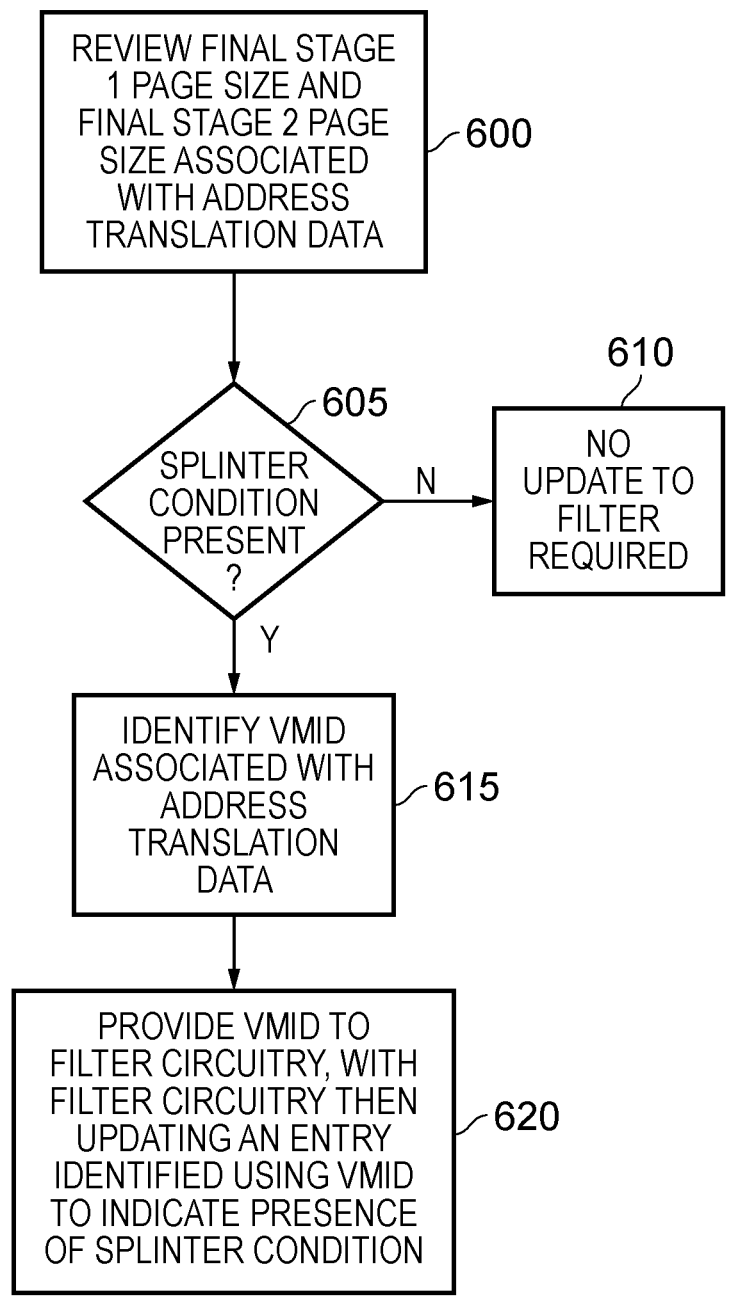
FIG. 10 is a flow diagram illustrating how the filter circuitry may be updated during an allocation process in accordance with one example arrangement.

FIG. 10 is a flow diagram illustrating how the filter circuitry may be populated on allocation of address translation data into the TLB 30. At step 600, the final stage 1 page size and final stage 2 page size associated with the address translation data is reviewed in order to determine whether a splinter condition exists. As discussed earlier this will be the case if the stage 1 page size is greater than the stage 2 page size, since in that event the final page size used for allocation will be the stage 2 page size.

If it is determined at step 605 that the splinter condition is not present, then as indicated by step 610, no update to the filter circuitry 580 is required.

However, if the splinter condition is present, the process proceeds to step 615, where the VMID associated with the address translation data is identified. At step 620 the VMID is provided to the filter circuitry, with the filter circuitry then updating an entry to specify that the splinter condition has been detected in association with that VMID. In the example illustrated in step 620 of FIG. 10, it is assumed that the filter circuitry has a form such as that shown in FIG. 11A, where the entry that is updated to indicate the presence of the splinter condition is an entry identified using the VMID.

Figure 11A:
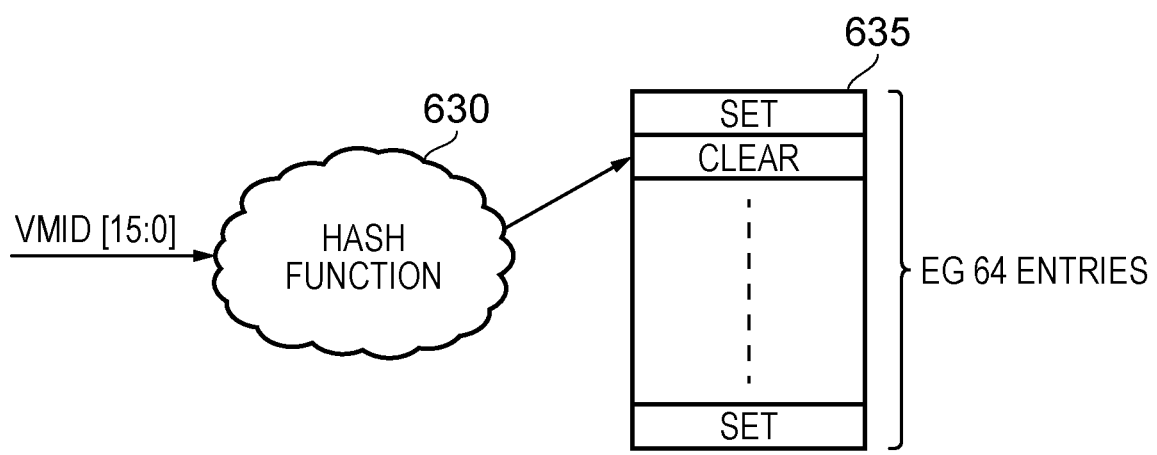
FIGS. 11A and 11B illustrate two different implementations that may be used for the filter circuitry.

FIG. 11A illustrates one form of probabilistic filter circuitry in the form of a Bloom filter, where the VMID information is input to a hash function 630 in order to generate a value that then identifies one of the entries within the set of entries 635 (in the examples shown there being 64 entries in the set of entries 635). For the entry pointed to by the hash value output from the hash function 630, that entry is then set to identify the presence of the splinter condition. It will be appreciated that more than one VMID value may point to the same entry in the Bloom filter. For example, if the VMID value is a 16-bit value as shown in FIG. 11A, then $2^{16}$ possible VMID values may be specified, which will each be mapped to one of the 64 entries in the set of entries 635 provided by the Bloom filter.

However, when the maintenance circuitry 560 subsequently references the filter circuitry using VMID information about the guest operating system associated with the page invalidate request, if the entry pointed to by the output from the hash function is clear, this will mean that no splinter condition exists for any address translation data allocated into the TLB that is associated with that guest operating system. In such instances, the maintenance circuitry can perform a significantly simplified page invalidate process as will be discussed later with reference to FIG. 12. Conversely, if the Bloom filter entry is set, it is assumed that the splinter condition exists in association with address translation data held in the TLB that is associated with that guest OS, and accordingly a larger number of entries are typically evaluated in order to deal with the page invalidate request, as will also be discussed later with reference to the later figures.

Figure 11B:
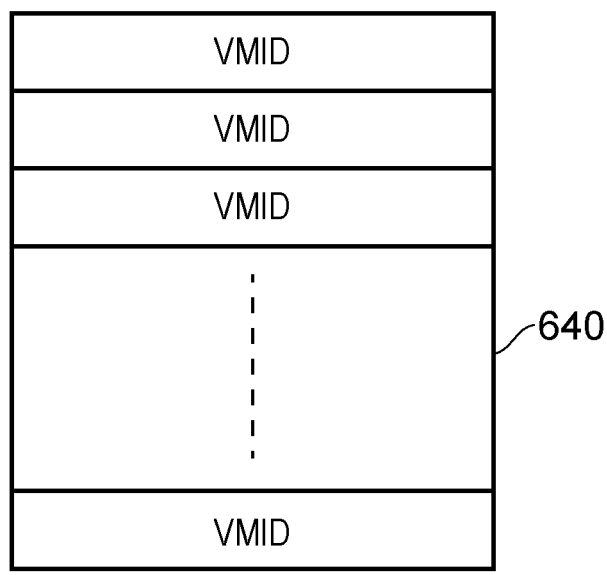

FIG. 11B illustrates an alternative form of filter circuitry 640, which merely comprises a predetermined number of entries, which are populated with VMID information based on VMIDs that are determined to be associated with address translation data allocated into the TLB for which the splinter condition exists. When the maintenance circuitry then comes to access the filter circuitry, it will merely determine whether the VMID associated with the page invalidate request is the same VMID as indicated in any of the entries of the filter circuitry 640, and if so will assume that the splinter condition exists. If the VMID associated with the page invalidate request does not match any of the VMIDs stored in the filter circuitry, then it can be determined that the splinter condition does not exist.

Figure 12:
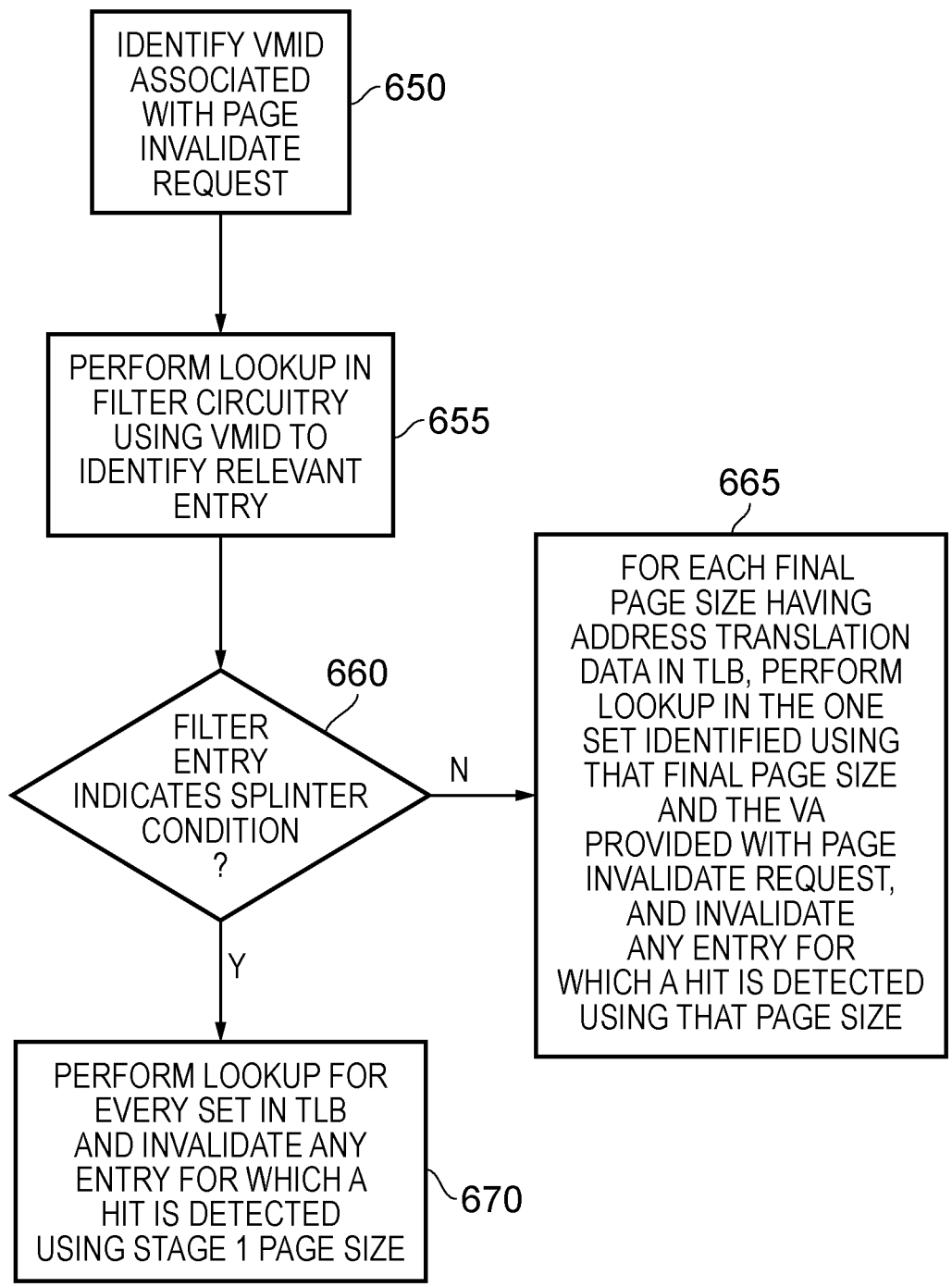
FIG. 12 is a flow diagram illustrating how a page invalidate request may be processed in accordance with one example arrangement.

FIG. 12 is a flow diagram illustrating processing of the page invalidate request by the maintenance circuitry 560 of FIG. 9. At step 650, the VMID associated with the page invalidate request is identified, and then at step 655 a lookup is performed in the filter circuitry using the VMID to determine whether the VMID is indicated in the filter circuitry as being associated with the splinter condition. In the remaining figures, it is assumed that the filter circuitry takes the form shown in FIG. 11A, and hence at step 655 the VMID is used to identify the relevant entry within the filter circuitry.

At step 660, it is determined whether that filter entry indicates the splinter condition. If not, then the process proceeds to step 665. Here, reference is made to a storage that keeps track of all of the page sizes allocated into the TLB. In one example implementation, an allocation vector is maintained to keep track of all of the page sizes that have been allocated into the TLB. For each final page size having address translation data in the TLB, then, as indicated by step 665, a lookup is performed in the one set identified using that final page size and the virtual address provided with the page invalidate request. Then, within that identified set, any entry for which a hit is detected using that page size information is invalidated. In particular, as will be apparent from the earlier discussion of FIG. 7, based on the page size information, the compare bits can be identified, and if the compare bits match between the virtual address provided by the page invalidate request and the virtual address information provided within the entry, then that entry will be invalidated.

Hence, it will be seen that where the filter entry indicates that the splinter condition is not present, a targeted process can be performed to handle the page invalidate request. In particular, it is only necessary to analyse the entries in one set for each final page size having address translation data stored in the TLB.

Conversely, if the filter entry does indicate the splinter condition, then the process proceeds to step 670 where a lookup is performed for every set in the TLB. In particular, any entry for which a hit is detected using the stage 1 page size identified in the page size information of the entry will then be invalidated. Hence, for each entry the stage 1 page size information will be determined from the page size field, and that will then determine the compare bits that are used when comparing the virtual address of the page invalidate request with the corresponding virtual address bits stored in the entry.

Figure 13:
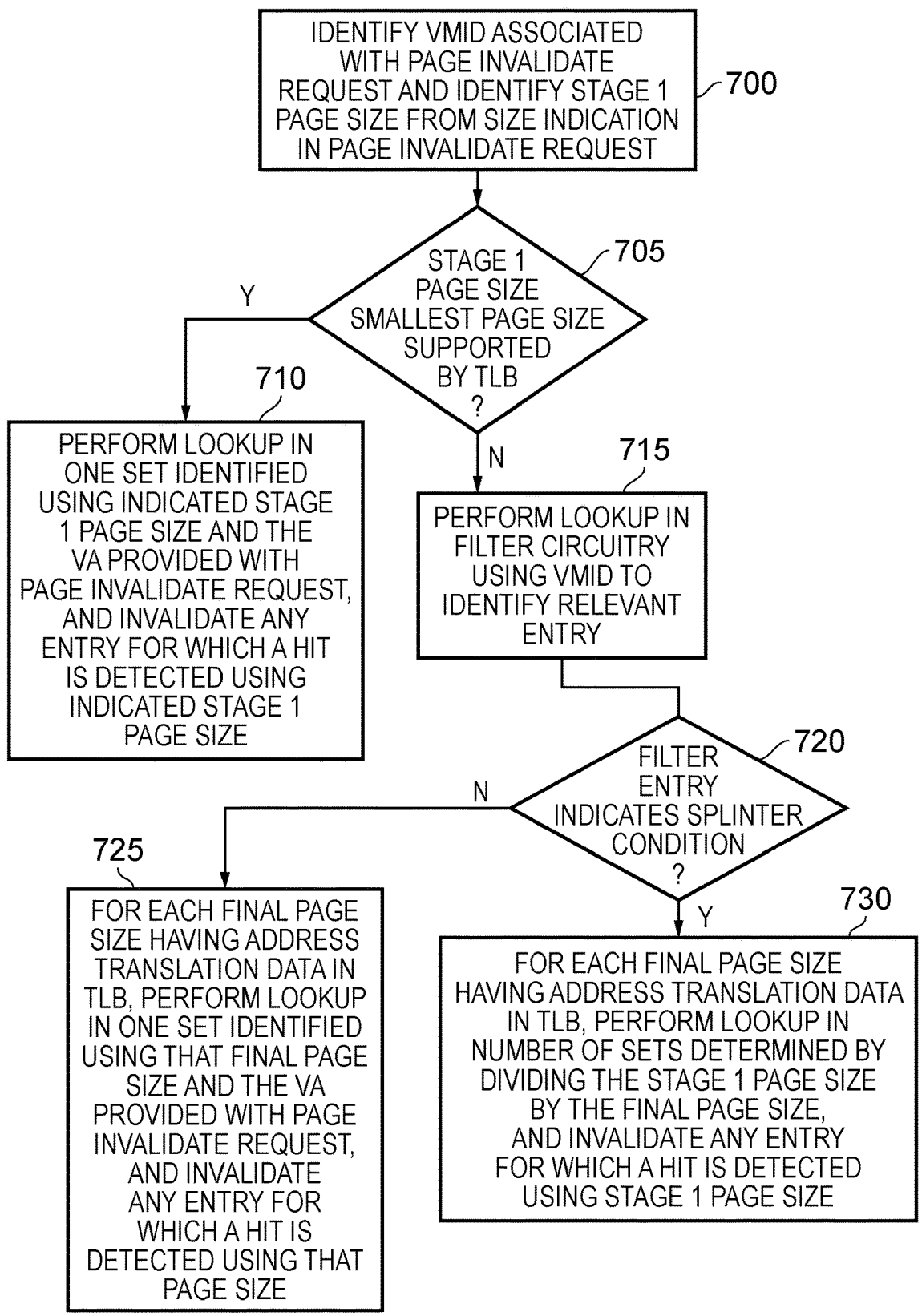
FIG. 13 is a flow diagram illustrating how a page invalidate request may be processed in accordance with an alternative arrangement, where the page invalidate request provides an indication of the first stage page size.

FIG. 13 is a flow diagram illustrating an alternative process that can be performed if the page invalidate request provides an indication of the first stage page size that that page invalidate request relates to. In particular, if the first stage page size information is provided, then this can reduce the number of entries that need to be analysed within the TLB when the splinter condition is present. At step 700, the VMID associated with the page invalidate request is identified, and in addition the page 1 stage size is also identified from the size indication information provided in the page invalidate request.

At step 705, it is determined whether the stage 1 page size is the smallest page size supported by the TLB. If it is, the process proceeds to step 710. In particular at this point, a lookup only needs to be performed in the one set that is identified using the indicated stage 1 page size and the virtual address provided with the page invalidate request. In particular, it is known that the stage 1 page size will have been the final page size, since it is the smallest page size supported by the TLB. Hence, once the lookup has been performed in the identified set, any entry for which a hit is detected using the indicated stage 1 page size is then invalidated.

Returning to step 705, if the stage 1 page size is not the smallest page size supported by the TLB, then there is a possibility of the splinter condition existing, and accordingly the process proceeds to step 715 where a lookup is performed in the filter circuitry using the VMID to identify the relevant entry. It is then determined at step 720 whether the filter entry indicates presence of the splinter condition.

If not, the process proceeds to step 725. Step 725 corresponds to step 665 of FIG. 12. However, if the splinter condition is present, then the process proceeds to step 730, which differs from the equivalent step 670 of FIG. 12, in that not every entry in the TLB needs to be considered. Instead, for each final page size having address translation data in the TLB, a lookup is performed in a number of sets determined by dividing the stage 1 page size by the final page size. Once the sets have been identified, then any entry within those sets for which a hit is detected using the stage 1 page size is invalidated.

The particular sets identified at step 730 will be illustrated by way of the following example. If the stage 1 page size is 64 KB, then it will understood from the earlier described example of FIG. 7 that the index bits will be bits 24 to 16. If the stage 2 page size is 4 KB, then it will be understood from the earlier example of FIG. 7 that the index bits are bits 20 to 12. Since the stage 1 page size is 16 times the stage 2 page size, then 16 sets need to be accessed. In particular, bits 15 to 12 of the virtual address are masked off and replaced with all of the 16 options for those bits. Hence, the indices are generated by using the virtual address bits 20 to 16, with bits 15 to 12 then taking the 16 different variants 0000 through 1111. This identifies the 16 sets that need to be subjected to the lookup procedure.

Figure 14:
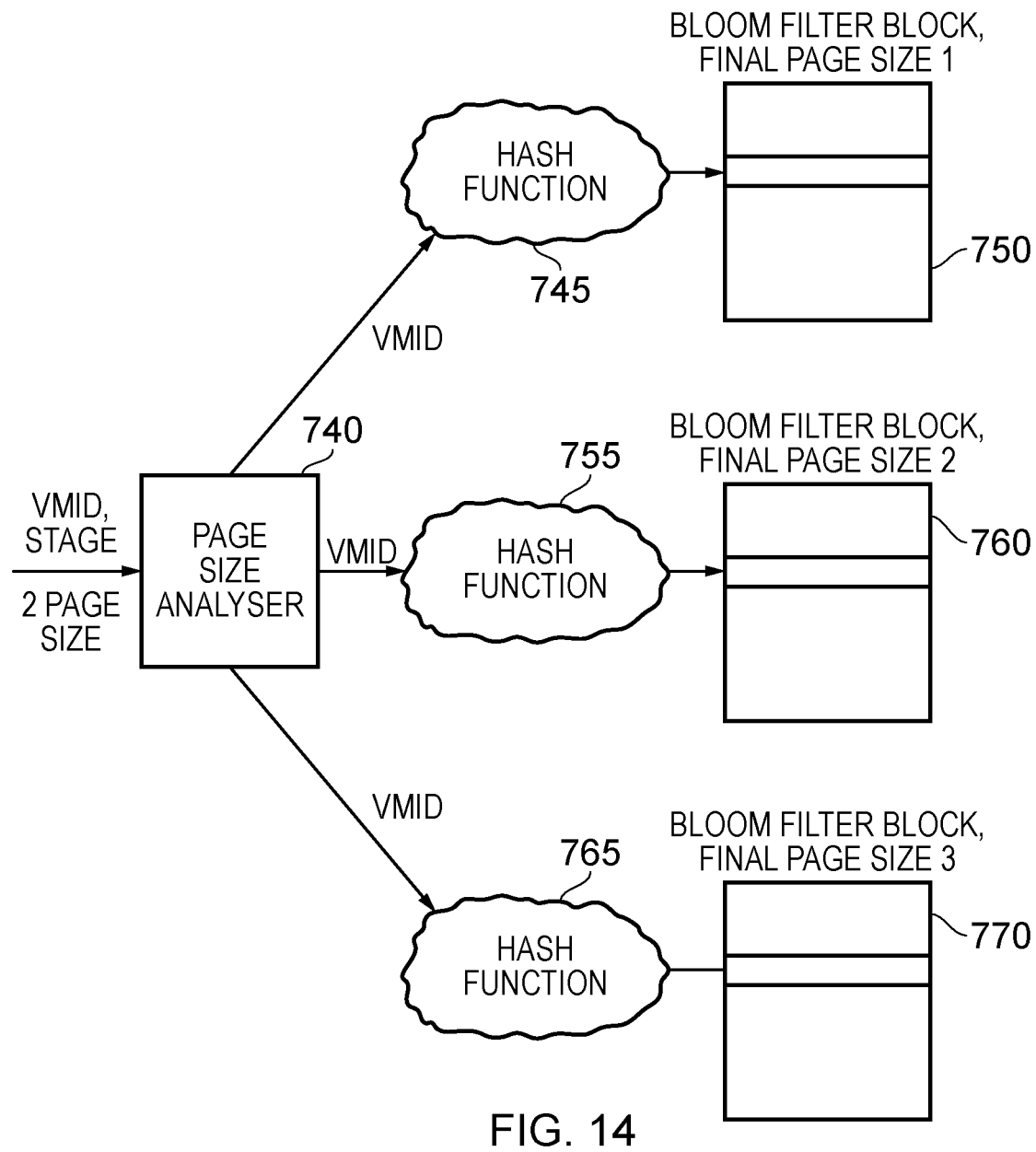
FIG. 14 is a diagram schematically illustrating an alternative form of filter circuitry that may be used in one example.

FIG. 14 illustrates a modified form of filter circuitry which is still arranged as a Bloom filter, but which includes a separate filter block 750, 760, 770 for each final page size supported by the TLB. In situations where the splinter condition is determined to exist at the time of allocating address translation data into the TLB, the allocation circuitry will provide the VMID information and the stage 2 page size information (which in the event of the splinter condition is the final page size information) to the page size analyser 740, which will then determine the appropriate Bloom filter block to be updated. Once the appropriate block has been identified, then the VMID information will be output to the relevant hash function 745, 755, 765, in order to identify a particular entry within the relevant Bloom filter block 750, 760, 770, with that entry then being set to indicate that the splinter condition has been detected in association with that VMID and the final page size associated with the filter block.

Figure 15:
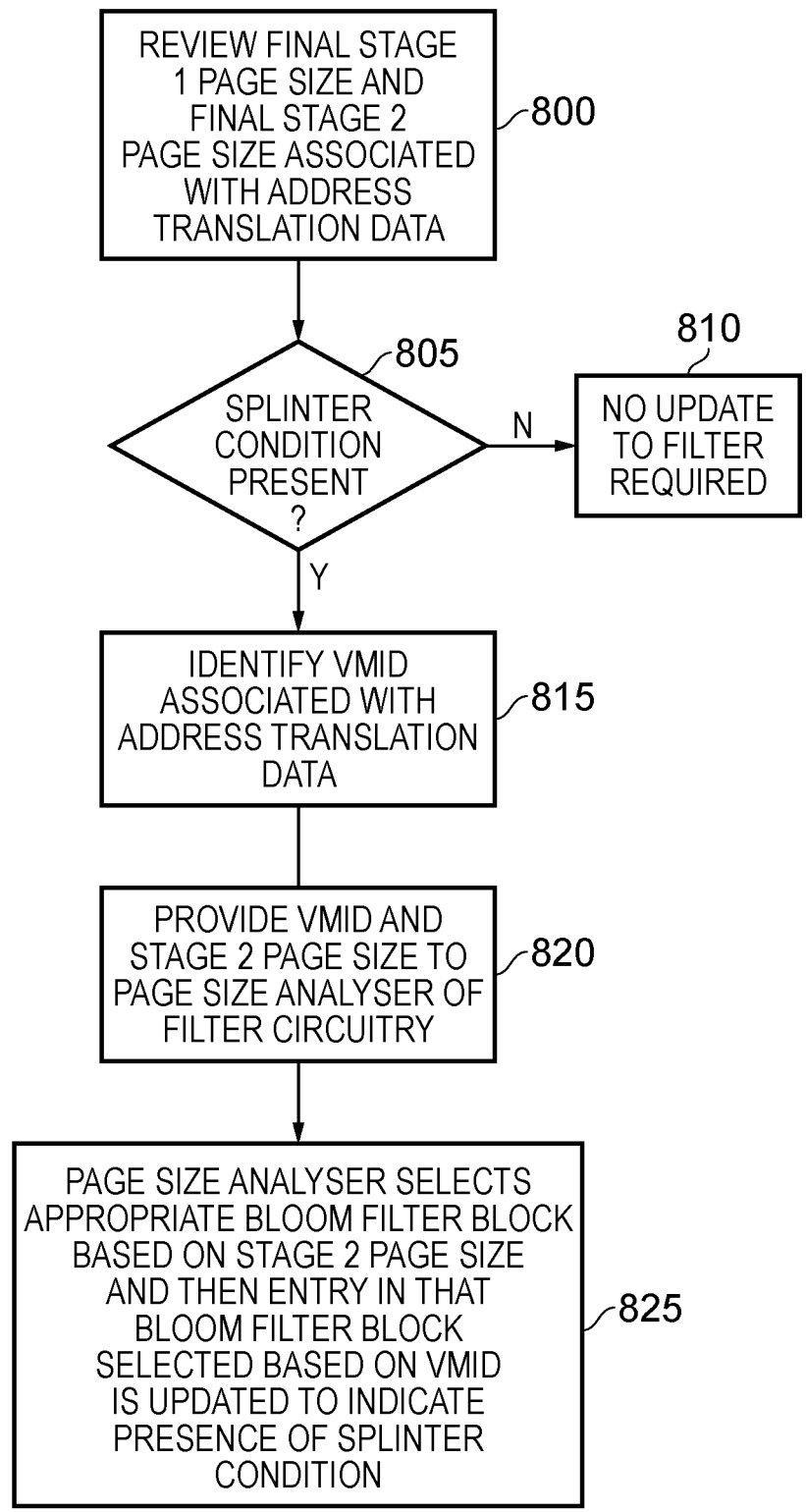
FIG. 15 is a flow diagram illustrating how the filter circuitry of FIG. 14 may be updated during an allocation process in accordance with one example arrangement.

FIG. 15 illustrates the process performed on allocation when using the alternative format of filter circuitry of FIG. 14. At step 800, the final stage 1 page size and the final stage 2 page size associated with the address translation data are reviewed in order to determine whether the splinter condition is present. If at step 805 it is determined that the splinter condition is not present, then as indicated by step 810, no update to the filter circuitry is required.

However, if the splinter condition is determined to be present, then the process proceeds to step 815 where the VMID associated with the address translation data is identified. At step 820, both the VMID and the stage 2 page size information is forwarded to the page size analyser 740. At step 825, the page size analyser then selects the appropriate Bloom filter block based on the page 2 stage size, and then an entry in that Bloom filter block selected based on the VMID is updated to indicate presence of the splinter condition.

Figure 16:
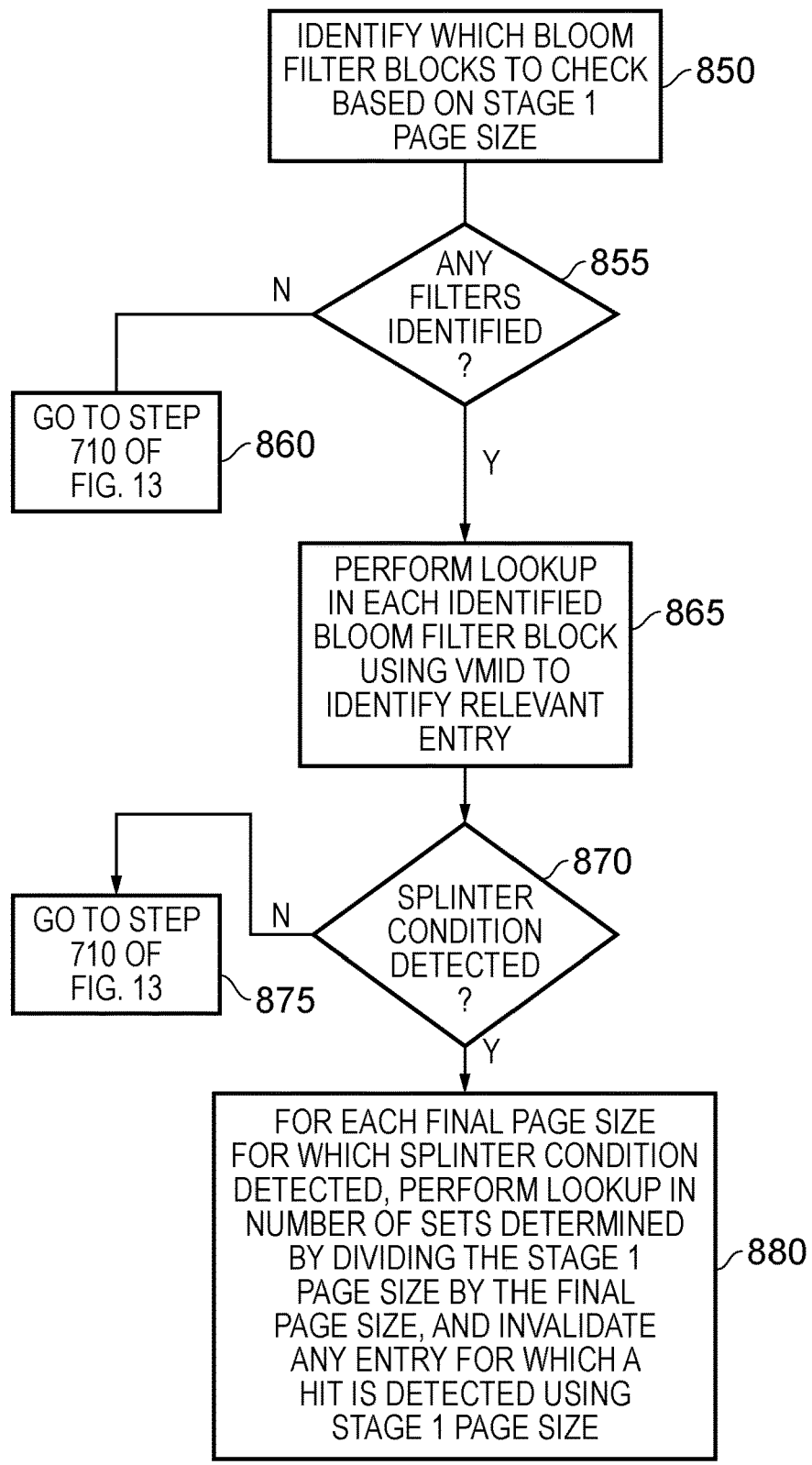
FIG. 16 is a flow diagram illustrating how certain steps within FIG. 13 may be altered when the filter circuitry of FIG. 14 is used, in accordance with one example.

FIG. 16 is a flow diagram illustrating an alternative sequence of steps to replace steps 715, 720 and 730 of FIG. 13, if the Bloom filter circuitry of FIG. 14 is used. At step 850, which is reached following the "no" path from step 705 of FIG. 13, it is identified which Bloom filters to check based on the stage 1 page size. In particular, those Bloom filter blocks associated with stage 2 page size smaller than the stage 1 page size will be identified at step 850. At step 855, it will be determined whether any filters were identified. If not, the process proceeds to step 860, where step 710 of FIG. 13 is implemented. In particular, in that instance it is known that the splinter condition is not present and that the stage 1 page size is the smallest supported page size.

However, as long as one or more filter blocks are identified, the process proceeds to step 865 where a lookup is performed in each identified Bloom filter block using the VMID to identify the relevant entry. It is then determined at step 870 whether the splinter condition is detected, and if not the process proceeds to step 875, where step 710 of FIG. 13 is performed. In particular, since the stage 1 page size is known, and it is known that there is no splinter condition, only one lookup is required.

However, in the presence of a splinter condition, the process proceeds to step 880, which differs from step 730 of FIG. 13. In particular, rather than having to perform a check for each final page size having address translation data in the TLB, as was required by step 730 of FIG. 13, at step 875 of FIG. 16 the check only needs to be performed for each final page size for which the splinter condition was detected. In particular, for each such final page size, a lookup is performed in a number of sets determined by dividing the stage 1 page size by the final page size, and any entry for which a hit is detected using the stage 1 page size is then invalidated.

There are a number of ways in which the page invalidate request can provide an indication of the first stage page size. In one example, it may specifically identify the first stage page size. As an alternative, it may provide a level hint indicative of the level within the stage 1 address translation process associated with the page size. Using this information, and information about the grain size associated with the stage 1 process (which in one example implementation may also be provided with the page invalidate request), the stage 1 page size can be determined, as illustrated by way of example with reference to the table of FIG. 17. The illustrative examples in FIG. 17 match those discussed earlier with reference to FIG. 7.

Figure 18:
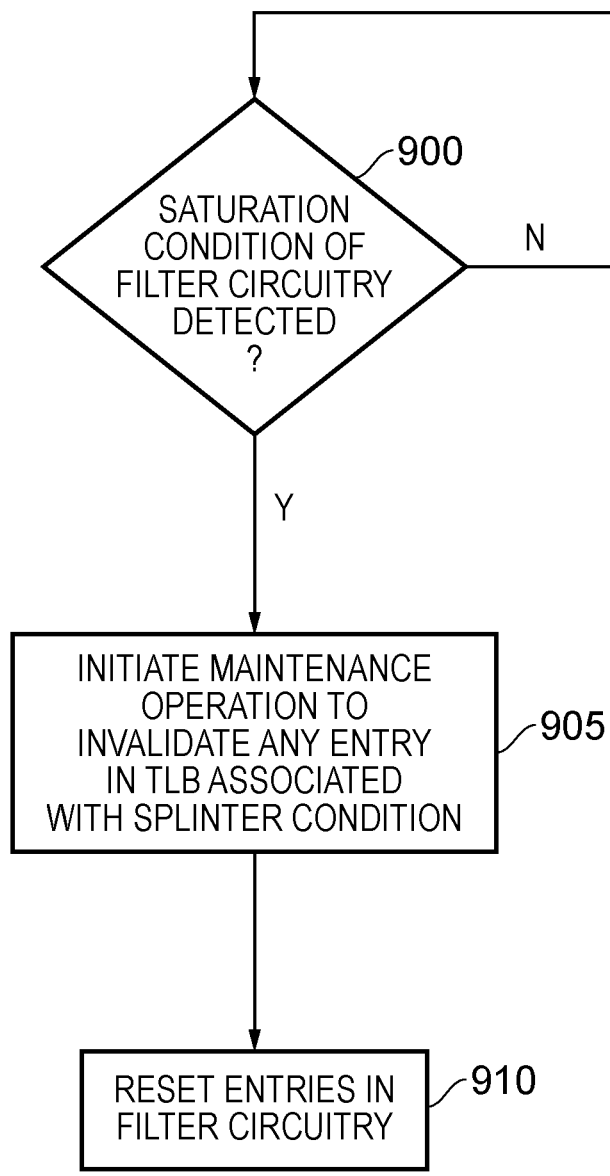
FIG. 18 is a flow diagram illustrating a saturation control process that may be performed in respect of the filter circuitry in accordance with one example arrangement.

FIG. 18 is a flow diagram illustrating steps that may be performed by the saturation control block 585 of FIG. 9 in respect of the filter circuitry 580, in accordance with one example. At step 900, it is determined whether the saturation condition of the filter circuitry is detected. When the saturation condition is detected, the process proceeds to step 905 where a maintenance operation is initiated to invalidate any entry in the TLB associated with the splinter condition. This can be determined by reviewing the page size information of each entry, which as discussed earlier provides an indication of the final page size and the stage 1 page size. If the stage 1 page size is greater than the final page size, this indicates the presence of the splinter condition, and that entry is invalidated. In an alternative implementation, each entry may include an explicit field which is set when the splinter condition is present, and in that instance it will merely be necessary to invalidate all entries for which that field is set.

Thereafter, at step 910 all of the entries in the filter circuitry are reset, thereby removing the saturation condition.

In implementations where the coarse filter circuitry 590 is also used, a similar approach can also be taken on detecting the saturation condition for the coarse filter circuitry. In that event, all entries obtained using a multi-stage translation process can be cleared, and then the coarse filter entries reset.

From the above described illustrative examples, it will be seen that the techniques described herein enable a significant performance improvement when handling page invalidate requests within a set associative address translation cache, in particular reducing the extent to which the address translation cache needs to be analysed in order to process page invalidate requests.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry to execute multiple items of supervised software under the control of a supervising element;

a set associative address translation cache having a plurality of entries, each entry to store address translation data used by the processing circuitry when converting a virtual address into a corresponding physical address of a memory system comprising multiple pages, the address translation data being obtained by a multi-stage translation process comprising a first stage translation process managed by an item of supervised software and a second stage translation process managed by the supervising element;

allocation circuitry, responsive to receipt of obtained address translation data for a specified virtual address and for which the first stage translation process was managed by a specified item of supervised software, to allocate the obtained address translation data into an entry of a selected set of the address translation cache, where the selected set is identified using a subset of bits of the specified virtual address chosen in dependence on a final page size associated with the obtained address translation data;

filter circuitry having a plurality of filter entries, and responsive to detecting that a splinter condition exists for the obtained address translation data, to indicate in a chosen filter entry that the splinter condition has been detected for the specified item of supervised software, the splinter condition existing when a first stage page size used in the multi-stage translation process exceeds the final page size; and maintenance circuitry, responsive to a page invalidate request associated with an item of supervised software, to reference the filter circuitry to determine which entries of the address translation cache need to be checked in order to process the page invalidate request in dependence on whether a filter entry of the filter circuitry indicates presence of the splinter condition for that item of supervised software.

2. An apparatus as claimed in claim 1, wherein when the corresponding filter entry indicates absence of the splinter condition for the item of supervised software associated with the page invalidate request, the maintenance circuitry is arranged to use a virtual address specified by the page invalidate request to perform a targeted checking process on a first subset of the sets of the address translation cache.

3. An apparatus as claimed in claim 2, wherein the first subset comprises one set of the address translation cache for each final page size associated with address translation data in the address translation cache.

4. An apparatus as claimed in claim 1, wherein when the corresponding filter entry indicates presence of the splinter condition for the item of supervised software associated with the page invalidate request, the maintenance circuitry is arranged to check every entry in the address translation cache in order to process the page invalidate request.

5. An apparatus as claimed in claim 1, wherein each item of supervised software comprises a guest operating system, and the supervising element is a hypervisor used to manage execution of the guest operating systems.

6. An apparatus as claimed in claim 5, wherein the filter circuitry is responsive to detecting that a splinter condition exists for the obtained address translation data, to indicate in the chosen filter entry that the splinter condition has been detected in association with the virtual machine identifier used to identify the guest operating system associated with the obtained address translation data.

7. An apparatus as claimed in claim 1, wherein the filter circuitry comprises a probabilistic data structure, the chosen filter entry is chosen in dependence on an identifier for the specified item of supervised software, and identifiers for a plurality of the items of supervised software map to the same filter entry.

8. An apparatus as claimed in claim 1, wherein the chosen filter entry is chosen to be a free filter entry amongst the plurality of filter entries, and the filter circuitry is arranged to store an identifier for the specified item of supervised software in the chosen filter entry.

9. An apparatus as claimed in claim 2, wherein:
the page invalidate request specifies a virtual address and a size indication of the first stage page size to which the page invalidate request relates; and
when the corresponding filter entry indicates presence of the splinter condition for the item of supervised software associated with the page invalidate request, the maintenance circuitry is arranged to use the virtual address and the size indication to perform an alternative targeted checking process on a second subset of the sets of the address translation cache.

10. An apparatus as claimed in claim 9, wherein the second subset comprises, for each final page size associated with address translation data in the address translation cache, a number of sets determined by dividing the indicated first stage page size by the final page size.

11. An apparatus as claimed in claim 9, wherein when the size indication indicates a smallest page size supported by the address translation cache, the maintenance circuitry is arranged to determine that the splinter condition is absent, without reference to the filter circuitry, and to perform a checking process on one set of the address translation cache determined from the virtual address and the smallest page size.

12. An apparatus as claimed in claim 9, wherein:
the filter circuitry comprises a filter block for each final page size supported by the address translation cache, each filter block comprising a plurality of filter entries;
the filter circuitry is responsive to detecting that a splinter condition exists for the obtained address translation data, to indicate the splinter condition in a chosen filter entry of the filter block corresponding to the final page size associated with the obtained address translation data.

13. An apparatus as claimed in claim 12, wherein:
the maintenance circuitry is responsive to the page invalidate request associated with an item of supervised software to reference at least a subset of the filter blocks to determine whether the corresponding filter entry indicates presence of the splinter condition; and
when at least one of the referenced filter blocks indicates presence of the splinter condition, the maintenance circuitry is arranged to determine the second subset of the sets to be subjected to the alternative targeted checking process in dependence on the one or more final page sizes for which the filter circuitry indicated presence of the splinter condition.

14. An apparatus as claimed in claim 13, wherein the maintenance circuitry excludes from the subset of the filter blocks to be referenced, any filter block for a final page size supported by the address translation cache that is equal to or greater than the first stage page size indicated by the size indication specified by the page invalidate request.

15. An apparatus as claimed in claim 13, wherein the second subset comprises, for each of the one or more final page sizes for which the filter circuitry indicated presence of the splinter condition, a number of sets determined by dividing the indicated first stage page size by that final page size.

16. An apparatus as claimed in claim 9, wherein:
each stage of the multi-stage translation process comprises a multi-level process; and
the size indication provided by the page invalidate request comprises a level hint, and the first stage page size is identified with reference to the level hint and a stage 1 grain size indication.

17. An apparatus as claimed in claim 1, wherein:
each stage of the multi-stage translation process comprises a multi-level process; and
the splinter condition exists when the first stage page size of the final level used in the first stage translations exceeds the final page size.

18. An apparatus as claimed in claim 1, further comprising:
saturation control circuitry, responsive to detecting a saturation condition in respect of the filter circuitry, to initiate a maintenance operation within the address translation cache to invalidate any entries of the address translation cache that contain address translation data for which the splinter condition exists;
the saturation control circuitry being further arranged on detecting the saturation condition to reset the entries of the filter circuitry to an initialised state.

19. An apparatus as claimed in claim 1, wherein the filter circuitry forms main filter circuitry, and the apparatus further comprises:
coarse filter circuitry to maintain a record of which items of supervised software are associated with address translation data allocated into the address translation cache;
the maintenance circuitry being arranged, responsive to the page invalidate request associated with an item of supervised software, to reference the coarse filter circuitry to determine whether the item of supervised software has any address translation data allocated into the address translation cache, and to proceed to reference the main filter circuitry when the coarse filter circuitry does indicate that the item of supervised software has address translation data allocated into the address translation cache.

20. A method of handling page invalidate requests in an address translation cache of an apparatus having processing circuitry for executing multiple items of supervised software under the control of a supervising element, the method comprising:

arranging the address translation cache as a set associative address translation cache having a plurality of entries, each entry storing address translation data used by the processing circuitry when converting a virtual address into a corresponding physical address of a memory system comprising multiple pages;

obtaining the address translation data by a multi-stage translation process comprising a first stage translation process managed by an item of supervised software and a second stage translation process managed by the supervising element;

allocating, responsive to receipt of obtained address translation data for a specified virtual address and for which the first stage translation process was managed by a specified item of supervised software, the obtained address translation data into an entry of a selected set of the address translation cache, where the selected set is identified using a subset of bits of the specified virtual address chosen in dependence on a final page size associated with the obtained address translation data;

responsive to detecting that a splinter condition exists for the obtained address translation data, indicating in a chosen filter entry of the filter circuitry that the splinter condition has been detected for the specified item of supervised software, the splinter condition existing when a first stage page size used in the multi-stage translation process exceeds the final page size; and responsive to a page invalidate request associated with an item of supervised software, referencing the filter circuitry to determine which entries of the address translation cache need to be checked in order to process the page invalidate request in dependence on whether a filter entry of the filter circuitry indicates presence of the splinter condition for that item of supervised software.

* * * * *